US012739682B2

(12) United States Patent
Karabulut et al.

(10) Patent No.: US 12,739,682 B2
(45) Date of Patent: Sep. 15, 2026

(54) APPARATUS, METHOD AND COMPUTER PROGRAM FOR MACHINE LEARNING BASED HANDOVER TRIGGERING

(71) Applicant: Nokia Technologies Oy, Espoo (FI)

(72) Inventors: Umur Karabulut, Munich (DE); Ahmad Masri, Tampere (FI); Anupam Shrivastava, Dallas, TX (US); Mustafa Cemil Coskun, Murray Hill, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 295 days.

(21) Appl. No.: 18/413,793

(22) Filed: Jan. 16, 2024

(65) Prior Publication Data

US 2024/0276265 A1 Aug. 15, 2024

(30) Foreign Application Priority Data

Feb. 6, 2023 (GB) ...................................... 2301611

(51) Int. Cl.
*H04W 36/24* (2009.01)
*H04W 24/10* (2009.01)
(Continued)

(52) U.S. Cl.
CPC ....... *H04W 24/10* (2013.01); *H04W 36/0083* (2013.01)

(58) Field of Classification Search
CPC .... H04B 7/088; H04B 17/318; H04B 7/0695; H04B 17/328; H04B 7/0626;
(Continued)

(56) References Cited

U.S. PATENT DOCUMENTS 9,955,445 B2 4/2018 Vrind et al.
10,542,469 B2 * 1/2020 Kang .................. H04W 36/085
(Continued)

FOREIGN PATENT DOCUMENTS

WO 2019/064229 A1 4/2019
WO 2019/100776 A1 5/2019
WO 2022/186458 A1 9/2022

OTHER PUBLICATIONS

"3rd Generation Partnership Project; Technical Specification Group Radio Access Network; NR; Physical layer procedures for control (Release 17)", 3GPP TS 38.213, V17.4.0, Dec. 2022, pp. 1-258.
(Continued)

*Primary Examiner* — John Pezzlo
(74) *Attorney, Agent, or Firm* — Carter, DeLuca & Farrell LLP

(57) ABSTRACT

There is provided an apparatus comprising means for determining, at a user equipment, a difference between signal strength for a first beam of a serving cell of a network and signal strength for a second beam of the serving cell, means for providing the determined difference as an input for a machine learning model, wherein the output of the machine learning model is numerical data or categorical data, means for determining, based on the output of the machine learning model, that a measurement report should be provided to the network and means for providing the measurement report to the network.

1 Claim, 18 Drawing Sheets

(51) Int. Cl.
*H04W 36/00* (2009.01)
*H04L 41/16* (2022.01)

(58) Field of Classification Search
CPC ...... H04B 17/382; H04L 41/16; B04W 24/10; B04W 72/046; B04W 36/0058; B04W 36/0883; H04W 36/24; H04W 72/046
USPC .......................... 370/252, 329, 331, 430, 442
See application file for complete search history.

(56) References Cited

U.S. PATENT DOCUMENTS

| | | | | |
|---|---|---|---|---|
| 11,659,543 | B1 * | 5/2023 | Marupaduga | H04W 72/542 370/315 |
| 12,096,265 | B2 * | 9/2024 | Cui | H04L 5/0048 |
| 2016/0219484 | A1 * | 7/2016 | Bontu | H04W 36/249 |
| 2018/0249453 | A1 * | 8/2018 | Nagaraja | H04B 7/0632 |
| 2019/0215888 | A1 * | 7/2019 | Cirik | H04B 7/088 |
| 2024/0121060 | A1 * | 4/2024 | Prasad | H04L 5/0051 |
| 2024/0381199 | A1 * | 11/2024 | Xu | H04W 36/322 |
| 2025/0168682 | A1 * | 5/2025 | Guan | G06N 20/00 |
| 2025/0260466 | A1 * | 8/2025 | Li | H04B 7/06952 |
| 2025/0365710 | A1 * | 11/2025 | Wang | H04B 17/318 |

OTHER PUBLICATIONS

"3rd Generation Partnership Project; Technical Specification Group Radio Access Network; NR, Medium Access Control (MAC) protocol specification (Release 17)", 3GPP TS 38.321, V17.2.0, Sep. 2022, pp. 1-246.
"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.
"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.
"5G; NR; Requirements for support of radio resource management (3GPP TS 38.133 version 17.7.0 Release 17)", ETSI TS 138 133, V17.7.0, Oct. 2022, 3823 pages.
"3rd Generation Partnership Project; Technical Specification Group Radio Access Network; Study on channel model for frequencies from 0.5 to 100 GHz (Release 17)", 3GPP TR 38.901, V17.0.0, Mar. 2022, pp. 1-98.
Karabulut, "Mobility Management in 5G Beamformed Systems", Doctoral Dissertation, Feb. 18, 2021, 163 pages.
United Kingdom Patent Application No. 2214245.9, "Timing Advance Triggering Measurement Report for FR2 Handover", filed on Sep. 29, 2022, pp. 1-83.
"Revised WID on Further NR mobility enhancements", 3GPP TSG RAN Meeting #96, RP-221799, Agenda: 9.3.2.1, MediaTek Inc., Jun. 6-9, 2022, 5 pages.
Search Report received for corresponding United Kingdom Patent Application No. 2301611.6, dated Jul. 17, 2023, 4 pages.
"RAN Chair's Summary of Rel-19 Workshop", RWS-230488, RAN Chair, Jun. 2023, 23 pages.
"RAN Chair's Guidance for RAN Release 19", 3GPP TSG RAN#101, RP-231540, Agenda: 8.A, RAN Chair, Sep. 11-15, 2023, pp. 1-15.
"Moderator's summary for REL-19 RAN2 topic AI/ML for Air Interface SI (Mobility)", 3GPP TSG RAN #101, RP-232622, Agenda: 8A.1, RAN1 Vice-chair (CMCC), Sep. 11-15, 2023, 5 pages.
"3rd Generation Partnership Project; Technical Specification Group Radio Access Network; NR; User Equipment (UE) radio access capabilities (Release 17)", 3GPP TS 38.306, V17.6.0, Sep. 2023, pp. 1-257.
"On Evaluation of AI/ML based Beam Management", 3GPP TSG RAN WG1 #112, R1-2300399, Agenda: 9.2.3.1, Google, Feb. 27-Mar. 3, 2023, 12 pages.
"Evaluation on AI/ML for beam management", 3GPP TSG RAN WG1 #112, R1-2300569, Agenda: 9.2.3.1, Xiaomi, Feb. 27-Mar. 3, 2023, 39 pages.
"AIML Model Transfer Requirements during Handover", 3GPP TSG-RAN WG2 Meeting #121, R2-2300253, Agenda: 8.16.2, NEC, Feb. 27-Mar. 3, 2023, pp. 1-3.

* cited by examiner

URA in yz - plane centered to the origin of the coordinate system with $N_{cx}$ = 128 antenna elements 3D Pattern of beamforming gain $G_b$ for 12 beam directions T1 — Providing a configuration of a machine learning model to a user equipment from a serving call of a network, wherein the input for the machine learning model is the difference between signal strength for a first beam of the serving cell and signal strength for a second beam of the serving cell determined at the user equipment and the output of the machine learning model is numerical data or categorical data T2 — Receiving a measurement report from the user equipment, wherein the user equipment determines to provide the measurement report based on the outcome of the machine learning model

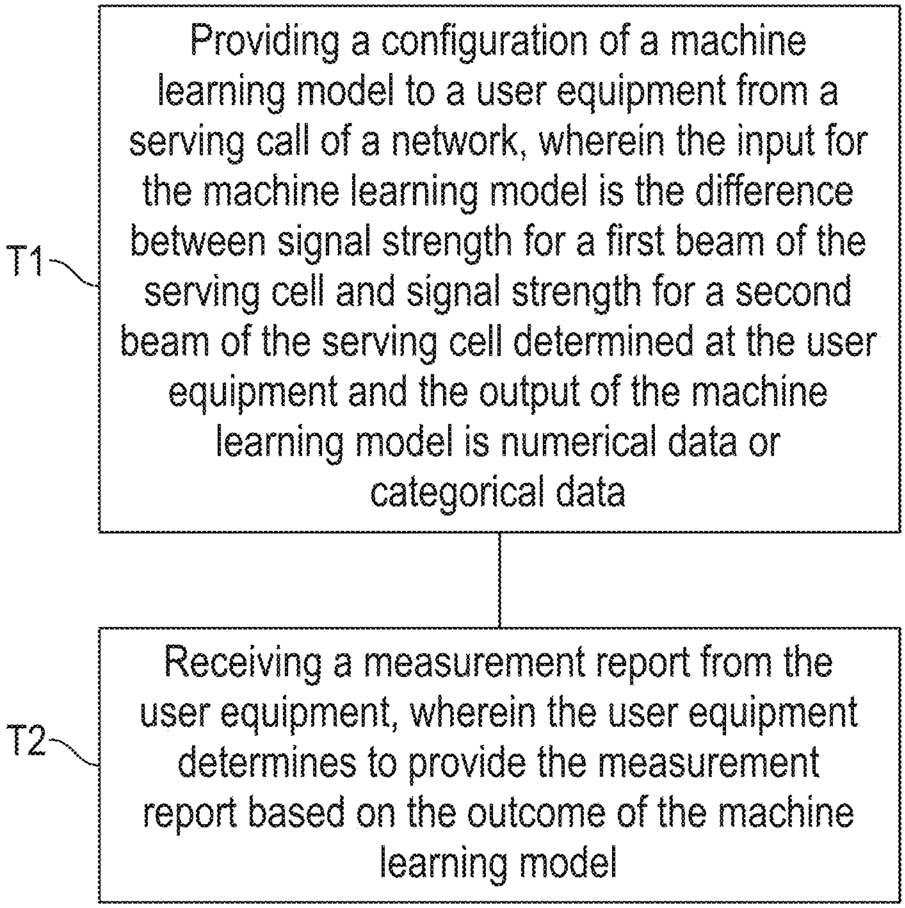

FIG. 12

APPARATUS, METHOD AND COMPUTER PROGRAM FOR MACHINE LEARNING BASED HANDOVER TRIGGERING

FIELD

The present application relates to a method, apparatus, system and computer program and in particular but not exclusively to a method for a machine learning (ML) based handover (HO) solution for path loss ambiguity.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for determining, at a user equipment, a difference between signal strength for a first beam of a serving cell of a network and signal strength for a second beam of the serving cell, means for providing the determined difference as an input for a machine learning model, wherein the output of the machine learning model is numerical data or categorical data, means for determining, based on the output of the machine learning model, that a measurement report should be provided to the network and means for providing the measurement report to the network.

The apparatus may comprise means for determining a timing advance value of the serving cell and a timing advance value of at least one non-serving cell and means for providing the determined timing advance values as an input to the machine learning model.

The apparatus may comprise means for receiving a configuration from the network to train the machine learning model at the user equipment and means for using at least one of the determined difference and the determined timing advance values to train the machine learning model at the user equipment.

The apparatus may comprise means for providing an indication of the determined difference and the determined timing advance values to the network for use in training the machine learning model at the network.

The apparatus may comprise means for providing an indication of the output of the machine learning model in the measurement report.

The measurement report may comprise an indication of the determined difference.

Means for determining that the measurement report should be provided to the network may comprise means for comparing the output of the machine learning model to a threshold value.

The numerical data may comprise a probability value.

The apparatus may comprise means for determining, at a user equipment, a difference between signal strength for a first beam of at least one non-serving cell and signal strength for a second beam of the at least one non-serving cell, means for providing the determined difference for the serving cell and the determined difference for the non-serving cell as an input for a further machine learning model, wherein the output of the further machine learning model is numerical data or categorical data, means for determining, based on the output of the further machine learning model, that a conditional handover procedure should be performed and means for performing the conditional handover procedure.

Means for determining that the conditional handover procedure should be performed may comprise means for comparing the output of the further machine learning model to a threshold value.

The apparatus may comprise means for determining a timing advance value of the serving cell of the network and a timing advance of the at least one non-serving cell and means for providing the determined timing advance values as a further input for the further machine learning model.

The apparatus may comprise means for receiving a configuration from the network to train the further machine learning model at the user equipment and means for using at least one of the determined difference and the timing advances values to train the further machine learning model at the user equipment.

The apparatus may comprise means for providing an indication of the determined differences and the determined timing advance values to the network for use in training the further machine learning model.

The first beam may comprise a channel state information reference signal. The second beam may comprise a synchronization signal or a physical broadcast channel.

The apparatus may comprise means for receiving an indication of a first beam index and a second beam index and means for determining the first beam and the second beam based on the indication of the first beam index and the second beam index.

In a second aspect there is provided an apparatus comprising means for providing a configuration of a machine learning model to a user equipment from a serving cell of the network, wherein the input for the machine learning model is the difference between signal strength for a first beam of the serving cell and signal strength for a second beam of the serving cell determined at the user equipment and the output of the machine learning model is numerical data or categorical data and means for receiving a measurement report from the user equipment, wherein the user equipment determines to provide the measurement report based on the outcome of the machine learning model.

The measurement report may comprise an indication of the difference between signal strength for a first beam of the serving cell and signal strength for a second beam of the serving cell determined at the user equipment. The apparatus may comprise means for providing an indication of the difference to a non-serving cell of the network.

The apparatus may comprise means for providing the indication to the non-serving cell in a handover request message.

The apparatus may comprise means for providing a configuration from the network to the user equipment to train the machine learning model at the user equipment.

The apparatus may comprise means for receiving an indication of the determined difference and timing advance values for the serving cells and non-serving cells for use in training the machine learning model at the network and means for using the using the received difference and the received timing advance values to train the machine learning model at the network.

The numerical data may comprise a probability value.

In a third aspect there is provided a method comprising determining, at a user equipment, a difference between signal strength for a first beam of a serving cell of a network and signal strength for a second beam of the serving cell, providing the determined difference as an input for a machine learning model, wherein the output of the machine learning model is numerical data or categorical data, determining, based on the output of the machine learning model, that a measurement report should be provided to the network and providing the measurement report to the network.

The method may comprise determining a timing advance value of the serving cell and a timing advance value of at least one non-serving cell and providing the determined timing advance values as an input to the machine learning model.

The method may comprise receiving a configuration from the network to train the machine learning model at the user equipment and using at least one of the determined difference and the determined timing advance values to train the machine learning model at the user equipment.

The method may comprise providing an indication of the determined difference and the determined timing advance values to the network for use in training the machine learning model at the network.

The method may comprise providing an indication of the output of the machine learning model in the measurement report.

The measurement report may comprise an indication of the determined difference.

Determining that the measurement report should be provided to the network may comprise comparing the output of the machine learning model to a threshold value.

The numerical data may comprise a probability value.

The method may comprise determining, at a user equipment, a difference between signal strength for a first beam of at least one non-serving cell and signal strength for a second beam of the at least one non-serving cell, providing the determined difference for the serving cell and the determined difference for the non-serving cell as an input for a further machine learning model, wherein the output of the further machine learning model is numerical data or categorical data, determining, based on the output of the further machine learning model, that a conditional handover procedure should be performed and performing the conditional handover procedure.

Determining that the conditional handover procedure should be performed may comprise comparing the output of the further machine learning model to a threshold value.

The method may comprise determining a timing advance value of the serving cell of the network and a timing advance of the at least one non-serving cell and providing the determined timing advance values as a further input for the further machine learning model.

The method may comprise receiving a configuration from the network to train the further machine learning model at the user equipment and using at least one of the determined difference and the timing advances values to train the further machine learning model at the user equipment.

The method may comprise providing an indication of the determined differences and the determined timing advance values to the network for use in training the further machine learning model.

The first beam may comprise a channel state information reference signal. The second beam may comprise a synchronization signal or a physical broadcast channel.

The method may comprise receiving an indication of a first beam index and a second beam index and determining the first beam and the second beam based on the indication of the first beam index and the second beam index.

In a fourth aspect there is provided a method comprising providing a configuration of a machine learning model to a user equipment from a serving cell of the network, wherein the input for the machine learning model is the difference between signal strength for a first beam of the serving cell and signal strength for a second beam of the serving cell determined at the user equipment and the output of the machine learning model is numerical data or categorical data and receiving a measurement report from the user equipment, wherein the user equipment determines to provide the measurement report based on the outcome of the machine learning model.

The measurement report may comprise an indication of the difference between signal strength for a first beam of the serving cell and signal strength for a second beam of the serving cell determined at the user equipment. The method may comprise providing an indication of the difference to a non-serving cell of the network.

The method may comprise providing the indication to the non-serving cell in a handover request message.

The method may comprise providing a configuration from the network to the user equipment to train the machine learning model at the user equipment.

The method may comprise receiving an indication of the determined difference and timing advance values for the serving cells and non-serving cells for use in training the machine learning model at the network and using the using the received difference and the received timing advance values to train the machine learning model at the network.

The numerical data may comprise a probability value.

In a fifth aspect there is provided an apparatus comprising: at least one processor and at least one memory storing instructions that, when executed by the at least one processor, cause the apparatus at least to determine, at a user equipment, a difference between signal strength for a first beam of a serving cell of a network and signal strength for a second beam of the serving cell, provide the determined difference as an input for a machine learning model, wherein the output of the machine learning model is numerical data or categorical data, determine, based on the output of the machine learning model, that a measurement report should be provided to the network and provide the measurement report to the network.

The apparatus may be caused to determine a timing advance value of the serving cell and a timing advance value of at least one non-serving cell and provide the determined timing advance values as an input to the machine learning model.

The apparatus may be caused to receive a configuration from the network to train the machine learning model at the user equipment and use at least one of the determined difference and the determined timing advance values to train the machine learning model at the user equipment.

The apparatus may be caused to provide an indication of the determined difference and the determined timing advance values to the network for use in training the machine learning model at the network.

The apparatus may be caused to provide an indication of the output of the machine learning model in the measurement report.

The measurement report may comprise an indication of the determined difference.

The apparatus may be caused to compare the output of the machine learning model to a threshold value.

The numerical data may comprise a probability value.

The apparatus may be caused to determine, at a user equipment, a difference between signal strength for a first beam of at least one non-serving cell and signal strength for a second beam of the at least one non-serving cell, provide the determined difference for the serving cell and the determined difference for the non-serving cell as an input for a further machine learning model, wherein the output of the further machine learning model is numerical data or categorical data, determine, based on the output of the further machine learning model, that a conditional handover procedure should be performed and means for performing the conditional handover procedure.

The apparatus may be caused to compare the output of the further machine learning model to a threshold value.

The apparatus may be caused to determine a timing advance value of the serving cell of the network and a timing advance of the at least one non-serving cell and provide the determined timing advance values as a further input for the further machine learning model.

The apparatus may be caused to receive a configuration from the network to train the further machine learning model at the user equipment and use at least one of the determined difference and the timing advances values to train the further machine learning model at the user equipment.

The apparatus may be caused to provide an indication of the determined differences and the determined timing advance values to the network for use in training the further machine learning model.

The first beam may comprise a channel state information reference signal. The second beam may comprise a synchronization signal or a physical broadcast channel.

The apparatus may be caused to receive an indication of a first beam index and a second beam index and determine the first beam and the second beam based on the indication of the first beam index and the second beam index.

In a sixth aspect there is provided an apparatus comprising: at least one processor and at least one memory storing instructions that, when executed by the at least one processor, cause the apparatus at least to provide a configuration of a machine learning model to a user equipment from a serving cell of the network, wherein the input for the machine learning model is the difference between signal strength for a first beam of the serving cell and signal strength for a second beam of the serving cell determined at the user equipment and the output of the machine learning model is numerical data or categorical data and receive a measurement report from the user equipment, wherein the user equipment determines to provide the measurement report based on the outcome of the machine learning model.

The measurement report may comprise an indication of the difference between signal strength for a first beam of the serving cell and signal strength for a second beam of the serving cell determined at the user equipment. The apparatus may be caused to provide an indication of the difference to a non-serving cell of the network.

The apparatus may be caused to provide the indication to the non-serving cell in a handover request message.

The apparatus may be caused to provide a configuration from the network to the user equipment to train the machine learning model at the user equipment.

The apparatus may be caused to receive an indication of the determined difference and timing advance values for the serving cells and non-serving cells for use in training the machine learning model at the network and use the using the received difference and the received timing advance values to train the machine learning model at the network.

The numerical data may comprise a probability value.

In a seventh aspect there is provided a computer readable medium comprising instructions which, when executed by an apparatus, cause the apparatus to perform at least the following: determining, at a user equipment, a difference between signal strength for a first beam of a serving cell of a network and signal strength for a second beam of the serving cell, providing the determined difference as an input for a machine learning model, wherein the output of the machine learning model is numerical data or categorical data, determining, based on the output of the machine learning model, that a measurement report should be provided to the network and providing the measurement report to the network.

The apparatus may be caused to perform determining a timing advance value of the serving cell and a timing advance value of at least one non-serving cell and providing the determined timing advance values as an input to the machine learning model.

The apparatus may be caused to perform receiving a configuration from the network to train the machine learning model at the user equipment and using at least one of the determined difference and the determined timing advance values to train the machine learning model at the user equipment.

The apparatus may be caused to perform providing an indication of the determined difference and the determined timing advance values to the network for use in training the machine learning model at the network.

The apparatus may be caused to perform providing an indication of the output of the machine learning model in the measurement report.

The measurement report may comprise an indication of the determined difference.

Determining that the measurement report should be provided to the network may comprise comparing the output of the machine learning model to a threshold value.

The numerical data may comprise a probability value.

The apparatus may be caused to perform determining, at a user equipment, a difference between signal strength for a first beam of at least one non-serving cell and signal strength for a second beam of the at least one non-serving cell, providing the determined difference for the serving cell and the determined difference for the non-serving cell as an input for a further machine learning model, wherein the output of the further machine learning model is numerical data or categorical data, determining, based on the output of the further machine learning model, that a conditional handover procedure should be performed and performing the conditional handover procedure.

Determining that the conditional handover procedure should be performed may comprise comparing the output of the further machine learning model to a threshold value.

The apparatus may be caused to perform determining a timing advance value of the serving cell of the network and a timing advance of the at least one non-serving cell and providing the determined timing advance values as a further input for the further machine learning model.

The apparatus may be caused to perform receiving a configuration from the network to train the further machine learning model at the user equipment and using at least one of the determined difference and the timing advances values to train the further machine learning model at the user equipment.

The apparatus may be caused to perform providing an indication of the determined differences and the determined timing advance values to the network for use in training the further machine learning model.

The first beam may comprise a channel state information reference signal. The second beam may comprise a synchronization signal or a physical broadcast channel.

The apparatus may be caused to perform receiving an indication of a first beam index and a second beam index and means for determining the first beam and the second beam based on the indication of the first beam index and the second beam index.

In an eighth aspect there is provided a computer readable medium comprising instructions which, when executed by an apparatus, cause the apparatus to perform at least the following providing a configuration of a machine learning model to a user equipment from a serving cell of a network, wherein the input for the machine learning model is the difference between signal strength for a first beam of the serving cell and signal strength for a second beam of the serving cell determined at the user equipment and the output of the machine learning model is numerical data or categorical data and receiving a measurement report from the user equipment, wherein the user equipment determines to provide the measurement report based on the outcome of the machine learning model.

The measurement report may comprise an indication of the difference between signal strength for a first beam of the serving cell and signal strength for a second beam of the serving cell determined at the user equipment. The apparatus may be caused to perform providing an indication of the difference to a non-serving cell of the network.

The apparatus may be caused to perform providing the indication to the non-serving cell in a handover request message.

The apparatus may be caused to perform providing a configuration from the network to the user equipment to train the machine learning model at the user equipment.

The apparatus may be caused to perform receiving an indication of the determined difference and timing advance values for the serving cells and non-serving cells for use in training the machine learning model at the network and using the using the received difference and the received timing advance values to train the machine learning model at the network.

The numerical data may comprise a probability value.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 12 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
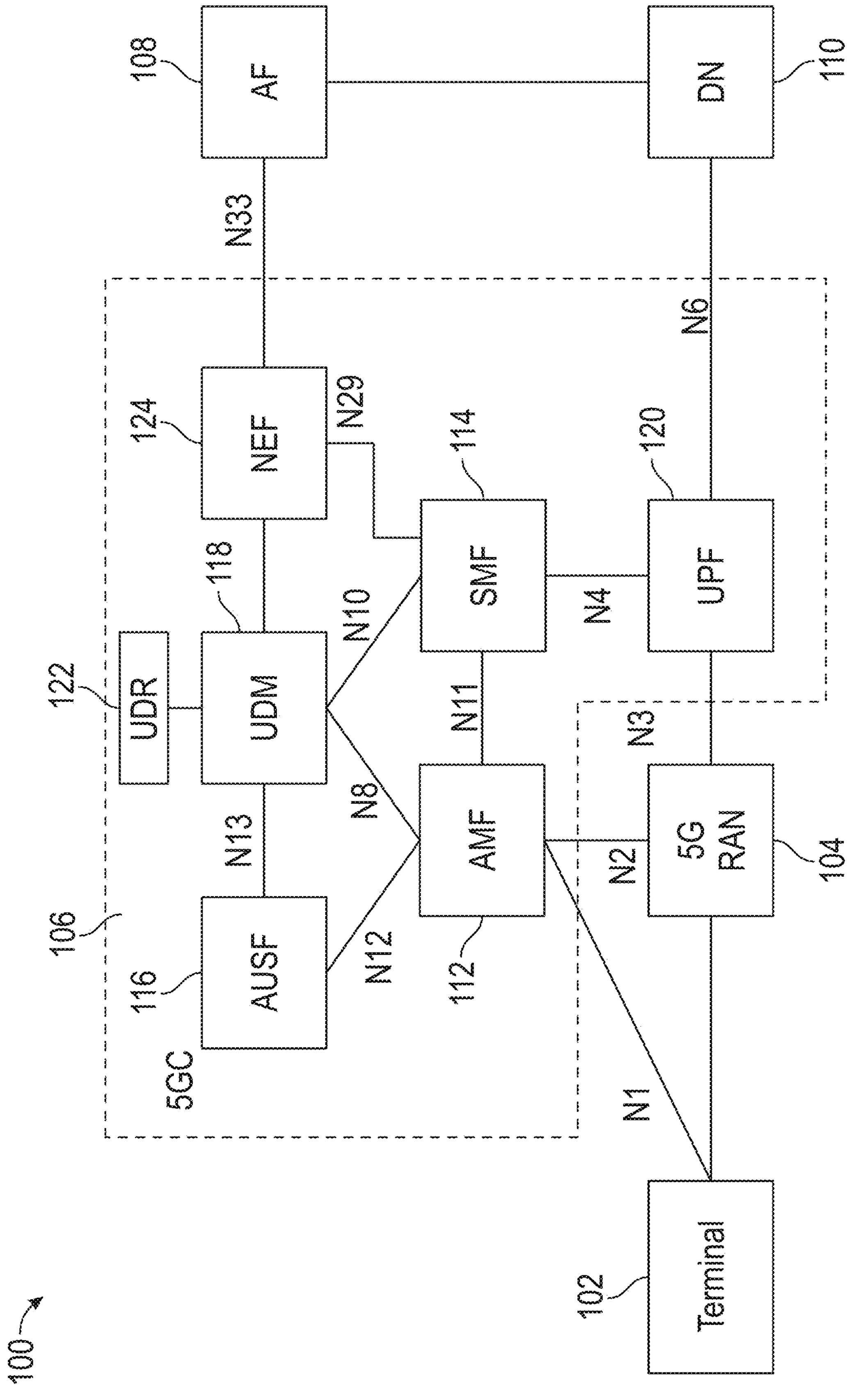
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes.

A User Plane Function (UPF) referred to as PDU Session Anchor (PSA) may be responsible for forwarding frames back and forth between the DN and the tunnels established over the 5G towards the UE(s) exchanging traffic with the DN.

Figure 2:
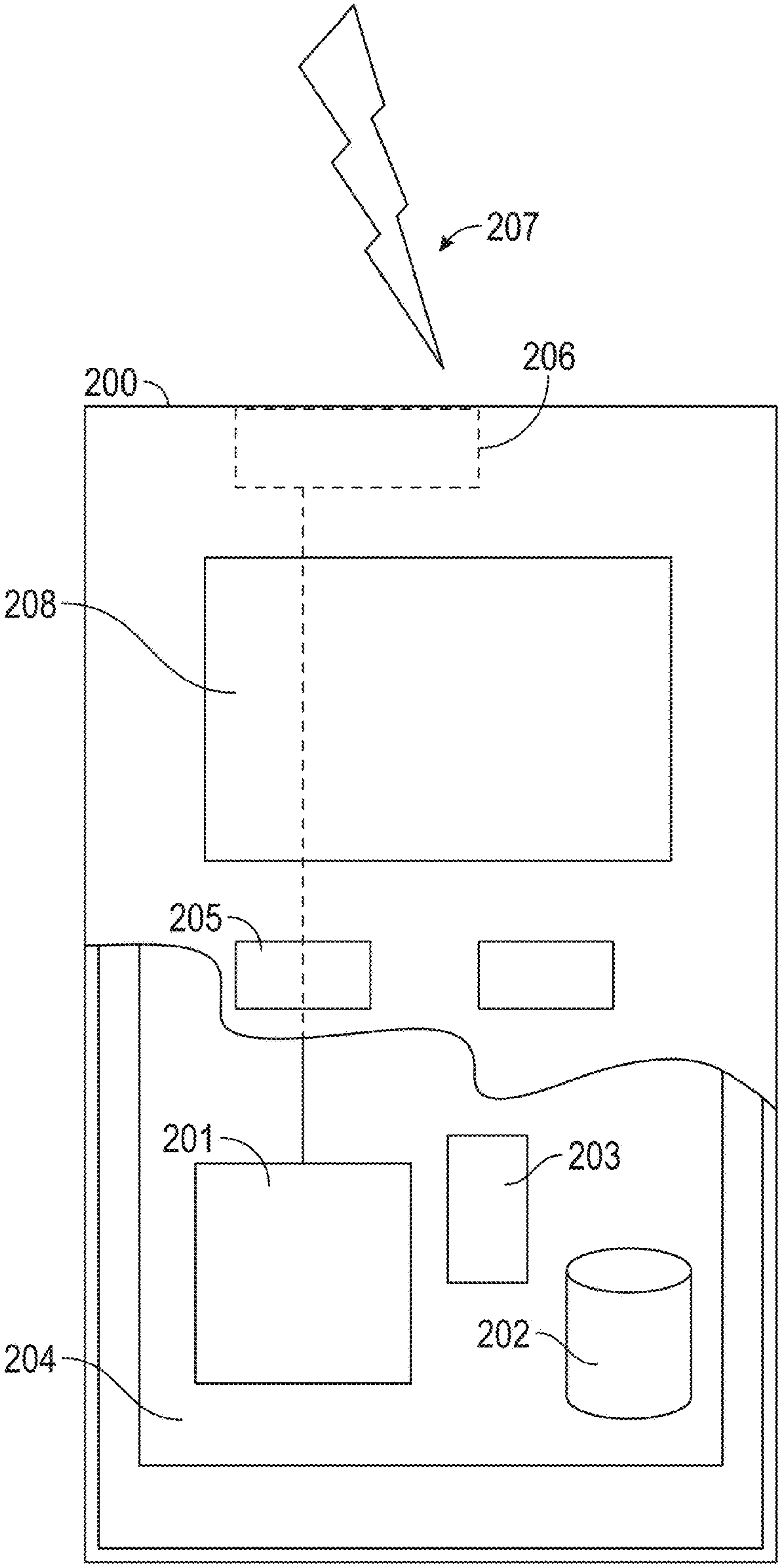
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
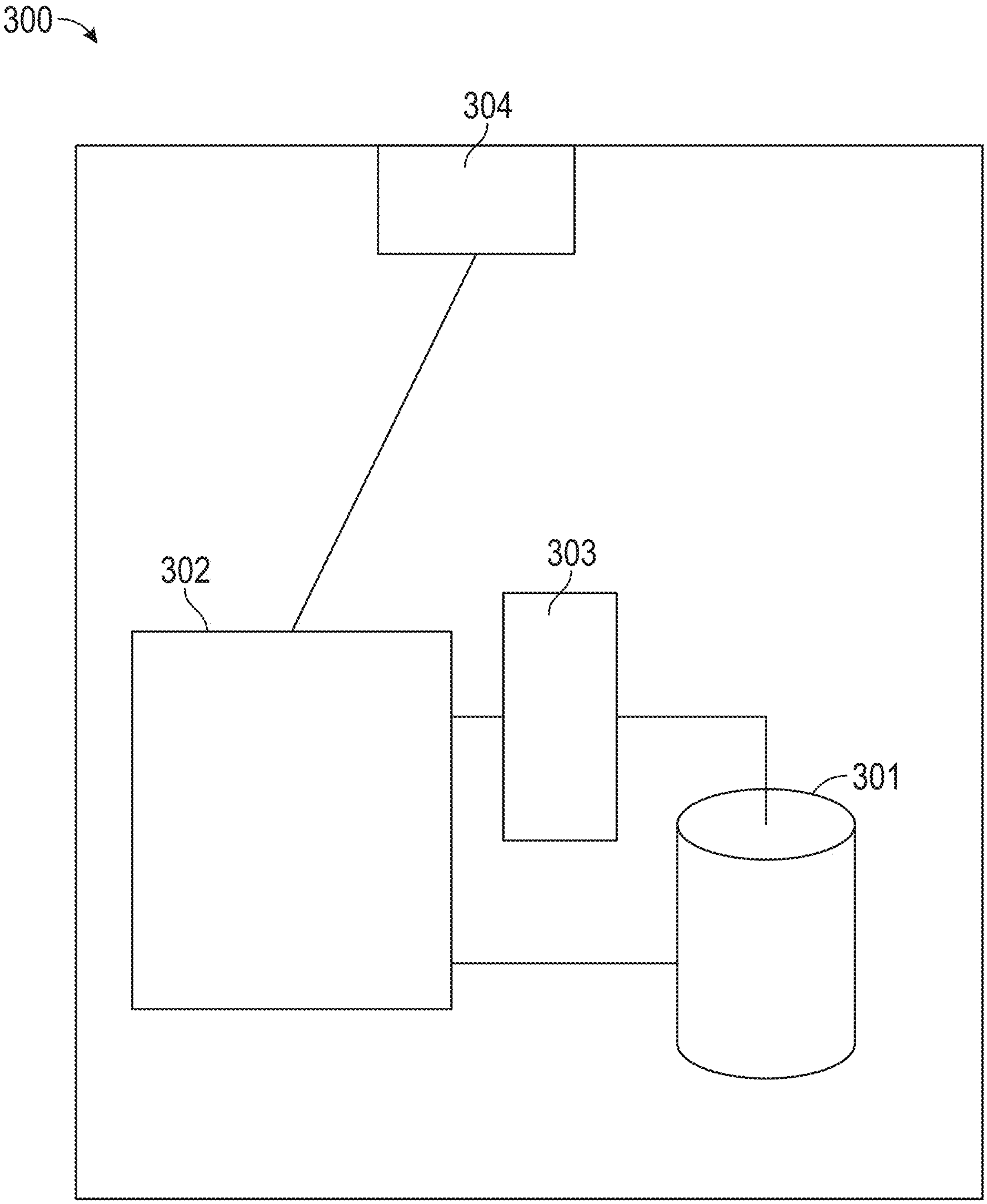
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

In mobile networks, a user equipment (UE) connects to the network through a cell which provides a good link quality, i.e., a link with signal-to-interference-noise-ratio above a certain threshold. If the UE moves away from the serving cell and gets closer to another neighbour cell, the received signal power of the serving cell degrades and the interference from the neighbour cell becomes dominant. Eventually, the network handovers (HO) the connection of the UE to the neighbour cell to sustain the connection to the network.

A UE measures the Reference Signal Received Power (RSRP) of the serving and neighbour cells and reports this to the serving cell. RSRP of the serving cell is compared by the serving cell against the RSRP of the neighbor cell to determine whether it is necessary to handover the connection of a UE from serving cell to another. The received signal power measurements may fluctuate due to channel/hardware impairments, e.g., thermal noise, fast-fading, measurement error and shadow fading. Using the measurements without any filtering may lead to suboptimal decisions due to rapid fluctuations and uncertainty on the measured signals. To mitigate such impairments and uncertainty and hence to avoid erroneous decisions, multiple measurement instances may be averaged by a moving average filter (L1 filter) and a recursive filter (L3 filter) which provides smooth average measurements, also called filtered measurements (or L3 measurements), at the expense of a delay in obtaining the averaged measurements (due to filtering).

UE measurements are fundamental part of the mobility in mobile networks. UEs measure the quality of serving cell and neighbour cells where those measurements are used to decide handover of a UE from one cell to another. Inaccurate cell quality measurements may lead to faulty handover decisions in the network and cause UEs to experience service interruption, e.g., Radio Link Failure (RLF), Handover Failure (HOF) or Ping-Pong (PP). Therefore, it is important for the UE to perform accurate cell quality measurements and hence, achieve good mobility performance.

Figure 4:
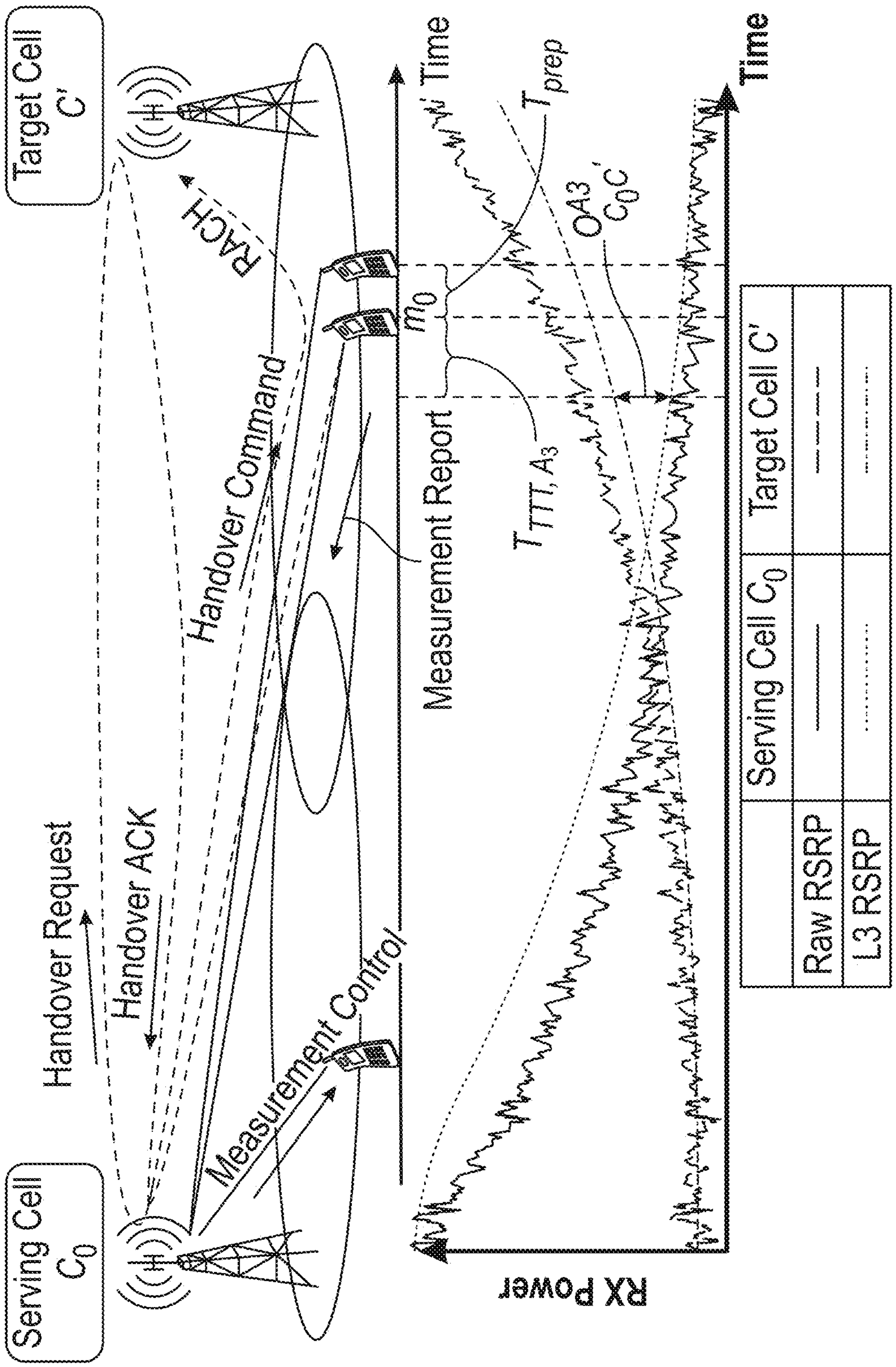
FIG. 4 shows a schematic diagram of a handover scheme for A3 event.

In FIG. 4, handover of a UE from serving cell $c_0$ to neighbor cell c' is illustrated along with the L3 measurements. Initially, L3 measurements from the serving and the neighbor cell are compared by the UE. Herein, if L3 measurements of a neighbor cell c' is offset $$o^{A3}_{c_0,c'}$$

dB better than the L3 measurement of the serving cell $c_0$ for the duration of a time-to-trigger period $T_{TTT}$, UE sends a measurement report to the serving cell. The serving cell requests a handover from the target cell. If the target cell acknowledges the request, the serving cell sends the handover command to the UE. UE initiates the handover with Random Access (RACH) procedure upon receiving the handover command.

A measurement model for UEs in RRC_CONNECTED mode has been defined in 3GPP standards. Herein, the UE measures at least one beam of a cell and the measurements results (e.g., power values) are averaged to derive the cell quality. In doing so, the UE is configured to consider a subset of the detected beams. Filtering takes place at two different levels: at the physical layer to derive beam quality and then at RRC (Radio Resource Control) level to derive cell quality from multiple beams. Cell quality from beam measurements is derived through the same way for both serving cell(s) and non-serving cell(s).

Figure 5:
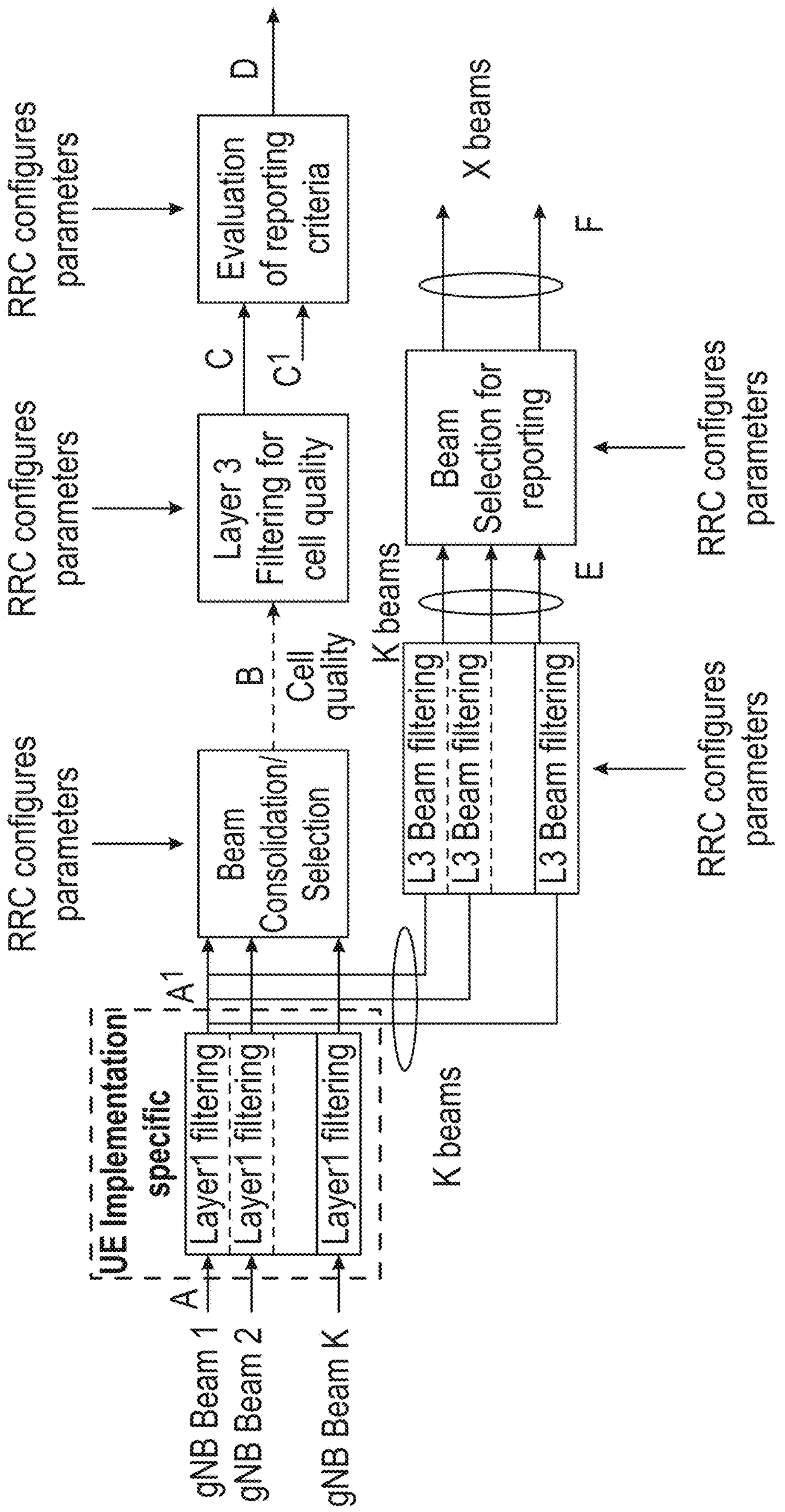
FIG. 5 shows measurement model from 3GPP standards.

FIG. 5 shows an example of a high level UE measurement model.

At A are shown measurements (beam specific samples) internal to the physical layer. At $A^1$, measurements (i.e. beam specific measurements) reported by layer 1 to layer 3 after layer 1 filtering are shown.

Internal layer 1 filtering of the inputs is measured at point A. Exact filtering is implementation dependent. How the measurements are actually performed in the physical layer by an implementation (inputs A and Layer 1 filtering) is not constrained by the standard.

Layer 3 filtering for cell quality: filtering performed on the measurements provided at point B, The behavior of the Layer 3 filter is standardized and the configuration of the layer 3 filter is provided by RRC signaling. Filtering reporting period at C equals one measurement period at B.

Layer 1 filtering introduces a certain level of measurement averaging. How and when the UE exactly performs the required measurements is implementation specific to the point that the output at B fulfils the performance requirements set in 3GPP standards.

L3 filter is a recursive filter which is defined in 3GPP standards and expressed as $$F_n = (1-a)\times F_{n-1} + a\times M_n.$$

Herein, $F_n$ is current L3 filter output (C in FIG. 5), $F_{n-1}$ is previous L3 filter output and $M_n$ is current L3 filter input (B in FIG. 5). $\alpha$ is the forgetting factor of recursive filter defined as $$a = \frac{1}{2^{\frac{k}{4}}}$$

and k is the filterCoefficient that is configured by the network to determine time characteristics of the L3 filter, i.e., in X ms, the input of the L3 filter $M_n$ will be reduced by factor of $(1-\alpha)$.

The network may configure a UE (in RRC_CONNECTED mode) to perform measurements. The network may configure the UE to report the measurements or use them to evaluate the condition associated with conditional reconfiguration for prepared target cells. The measurement configuration is provided by means of dedicated signalling. e.g., using the RRCReconfiguration or RRCResume.

The network may configure the UE to report the following measurement information based on SS/PBCH block(s):

Measurement results per SS/PBCH block;

Measurement results per cell based on SS/PBCH block(s);

SS/PBCH block(s) indexes.

The network may configure the UE to report the following measurement information based on CSI-RS resources:

Measurement results per CSI-RS resource;

Measurement results per cell based on CSI-RS resource(s);

CSI-RS resource measurement identifiers.

Measurement configuration may include parameters as follows. Measurement objects are a list of objects (measurement frequency) on which the UE shall perform the measurements).

Reporting configurations are a list of reporting configurations where there can be one or multiple reporting configurations per measurement object. Each measurement reporting configuration consists of reporting criterion (periodic or event triggered), reference signal (RS) type (SS/PBCH block or CSI-RS), and reporting format. In case of conditional reconfiguration, i.e., Conditional Handover (CHO), Conditional Primary Secondary Cell Addition and Change (CPAC), reporting configurations consist of execution criteria and Reference signal (RS) type.

For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. For conditional reconfiguration triggering, measurement identity is associated to one conditional reconfiguration trigger configuration. Up to two measurement identities may be linked to one conditional reconfiguration execution condition.

Quantity configurations define the measurement filtering configuration used for all event evaluation and related reporting, and for periodical reporting of that measurement. For NR measurements, the network may configure up to two quantity configurations with a reference in the NR measurement object to the configuration that is to be used.

Measurement gaps are periods that the UE may use to perform measurements.

The configuration of the measurements are provided in RRC Reconfiguration, i.e., RRCReconfiguration→MeasConfig→MeasObjectToAddModList→MeasObjectNR. The IE MeasObjectNR specifies information applicable for SS/PBCH block(s) intra/inter-frequency measurements and/or CSI-RS intra/inter-frequency measurements.

As was described above, two type of reference signals that can be configured for UE measurements are Synchronization Signal Blocks (SSBs) and Channel State Information Reference Signal (CSI-RS) where both signals are transmitted using beamforming. The highlights of those reference signals are given below.

SS/PBCH Block or SSB carries synchronization signals (SS) and PBCH (physical broadcast channel) and are transmitted periodically using beam sweeping.

CSI-RS is a reference signal (RS) transmitted using a tighter beam with higher beamforming gain compared to the SSB beams (useful for data transmission). CSI-RS is configured on need basis. UE cannot measure a CSI-RS resource if not configured/activated by the network.

Figure 6:
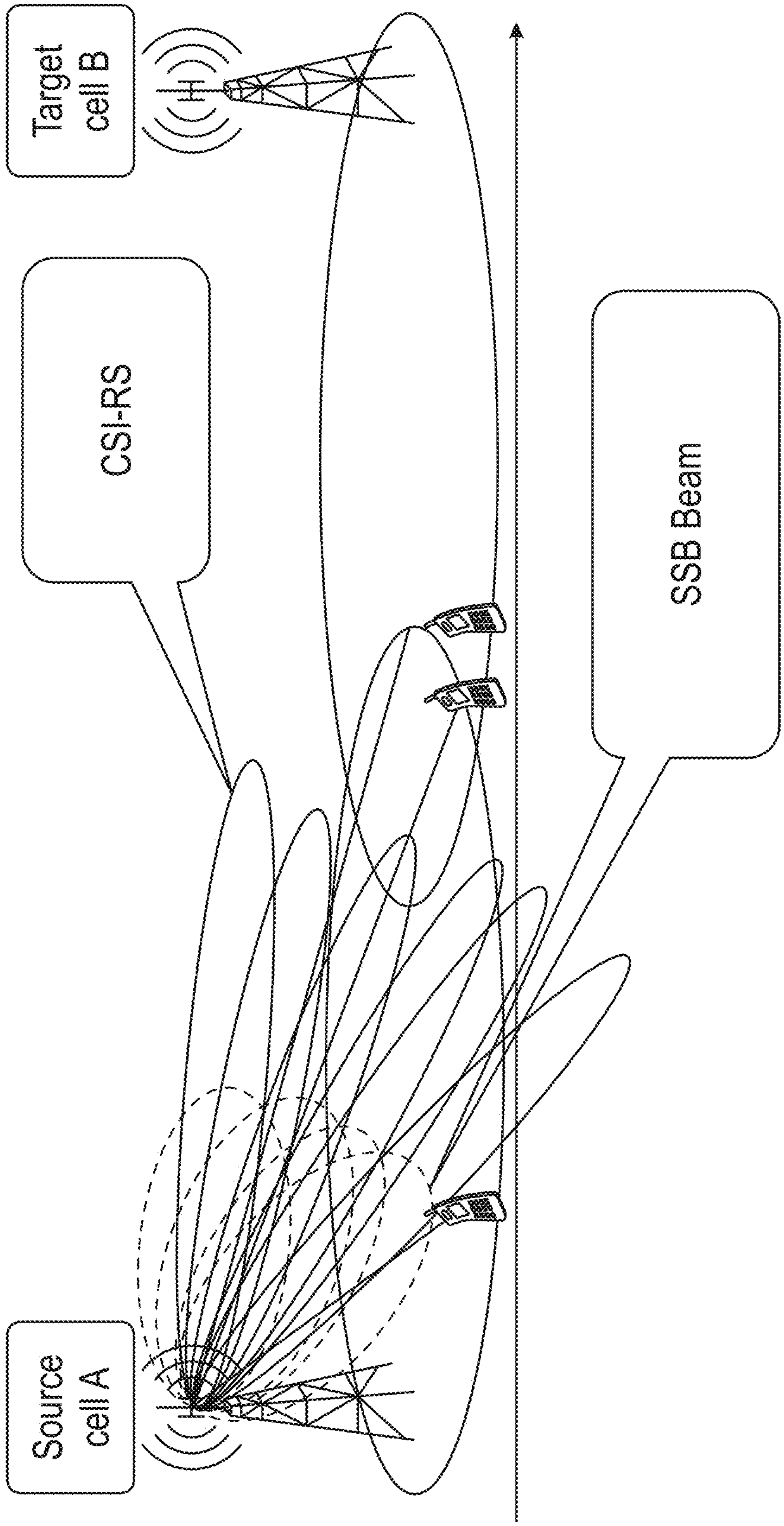
FIG. 6 shows a schematic diagram of SSB and CSI-RS beams.
Figure 7:
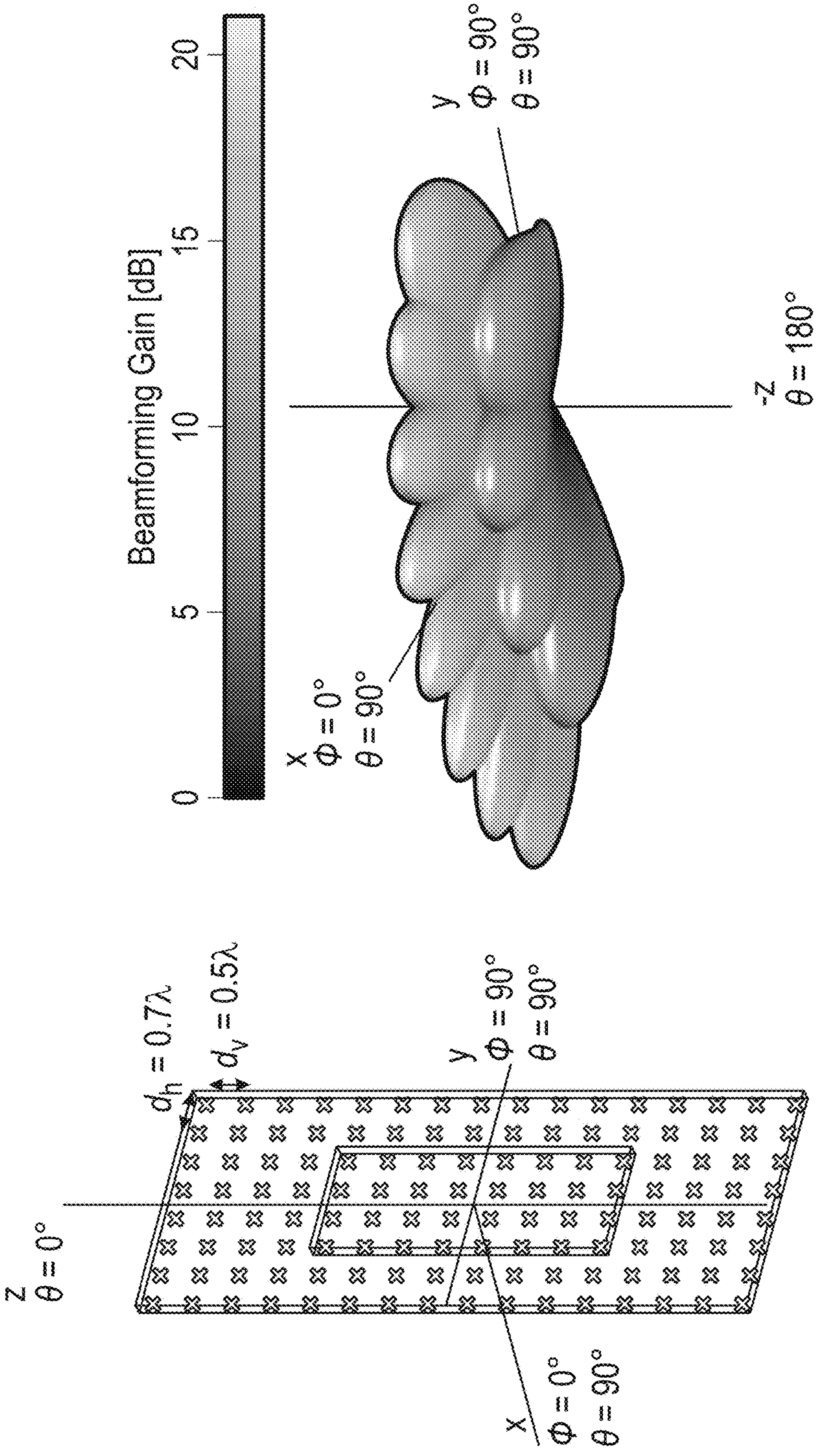
FIG. 7 shows an example beam layout for FR2.

The main propagation difference between SSB and CSI-RS beams is the form of the beams that are used to transmit those signals. As shown in FIG. 6, the SSB beams are wide beams with weaker beamforming gain, whereas the CSI-RS beams are steep, narrow beams with high beamforming gain (high directivity). In a typical Frequency Range 2 (FR2) deployment scenario, one can assume that there are 4 SSB beams and 8+4 CSI-RS beams to cover whole cell area. The 8 beams of CSI-RS are configured for cell-edge coverage and the other 4 CSI-RS beams are used for inner-cell area coverage (see in FIG. 7, which shows CSI-RS beams).

The delay between a UE sending a measurement report and the UE receiving the handover command is around 50 ms. During that 50 ms, the link quality of the serving cell and target cell can change significantly (in particular in FR2 beamformed system) and finding an optimum point in time to decide handover is not a trivial task due to the so-called "Early-but-late" dilemma.

Handover (HO) should be executed early so that the link between the UE and the serving cell is strong enough for UE to deliver the measurement report and receive handover command. If the handover is triggered "Too Late (TL)", UE either fails to deliver the measurement report or receive the handover command. Eventually, UE cannot handover to the target cell and is likely to fall into radio link failure soon.

Handover should be executed late so that the link between UE and the target cell is strong enough (secure RACH towards target). If the handover is triggered "Too Early (TE)" before the link of the target is not strong enough, UE fails to complete the RACH/handover, or it completes the RACH/handover and falls into a radio link failure shortly after.

Considering the "Too Early (TE)" and "Too Late (TL)" issues above, it is required to find an optimum point in time to decide on handover which is early enough to secure communication with source cell and late enough to secure RACH towards target cell.

A network can configure cell pair specific handover offset for each cell border to fix "Too Early (TE)" and "Too Late (TL)" handover problems as configuring small cell individual offset for cell borders with "Too Early (TE)" handovers: This will trigger handovers late enough so that the target cell power will be stronger when handover is initiated. This may be the case e.g. with slow UEs. Configuring large cell individual offset for cell borders with "Too Late (TL)" handovers: Similarly, this triggers handovers earlier and UE initiates handover before link quality between serving cell and the UE becomes degraded. This may be the case e.g. with fast UEs.

In frequency range 2 (FR2, higher frequency band that is used in 5G), "Early-but-late" dilemma may be more pronounced due to more rapid signal degradations, for example if the UE gets closer to the cell edge where beamforming gain decreases and path loss increases simultaneously. In addition, the impact of shadow fading due to blockage of the signal by large objects may be more pronounced on the cell edge. Under these circumstances, "Too Late (TL)" handovers may be observed frequently since link quality between UE and the network degrades quickly and link fails before UE sends measurement report (too late to send measurement report). Fixing those TL handovers with larger handover offset is not a feasible solution since it requires a large offset configuration which may cause a number of TE problems to be observed on other areas of the same cell border without solving the TL handover problems.

Figure 8B:
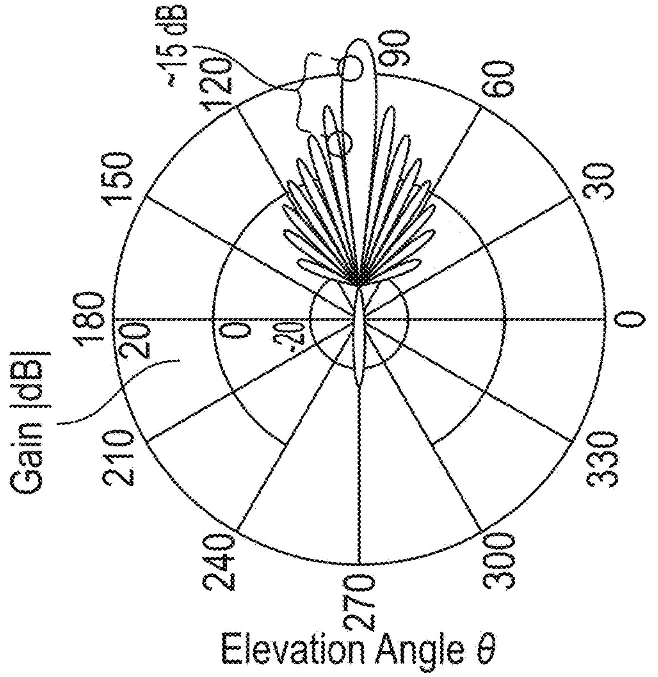
FIG. 8*b* shows an example elevation pattern of a serving beam.
Figure 8A:
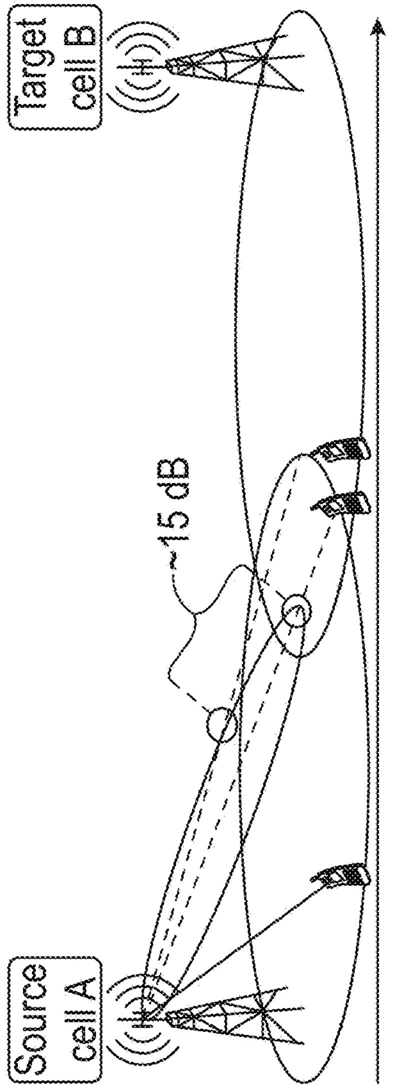
FIG. 8*a* shows an example mobility scenario for a UE moving from cell center towards cell border.

FIG. 8 shows an example FR2 mobility scenario. In FIG. 8*a*, a UE, served by source cell A, moves from cell center towards cell border and served by a beam (shown in red). FIG. 8*b* shows the elevation pattern of the beamforming gain that is formed by 16×8 antenna panel (~21 dB gain on boresight). When the UE moves from the cell center towards the cell edge on the given trajectory, in FIG. 8*a*, the path loss increases due to the increased distance between UE and source cell A. On the other hand, the beamforming gain increases as the angle of departure (AoD) increases and UE moves towards the boresight of the beamforming gain. Eventually, the signal degradation caused by path loss is compensated by the beamforming gain so that the UE reference signal received power (RSRP) measurements does not decline with increasing distance between serving cell and the UE. However, when the UE continues to move towards target cell, beamforming gain also decreases for increasing distance since the AoD would increase beyond the boresight of the serving beam (see FIGS. 8*a* and 8*b,* 15 dB decrease in a short distance). Ultimately, both decrease in beamforming gain and increase in path loss leads a sharp degradation in RSRP measurements on the cell edge.

Figure 9:
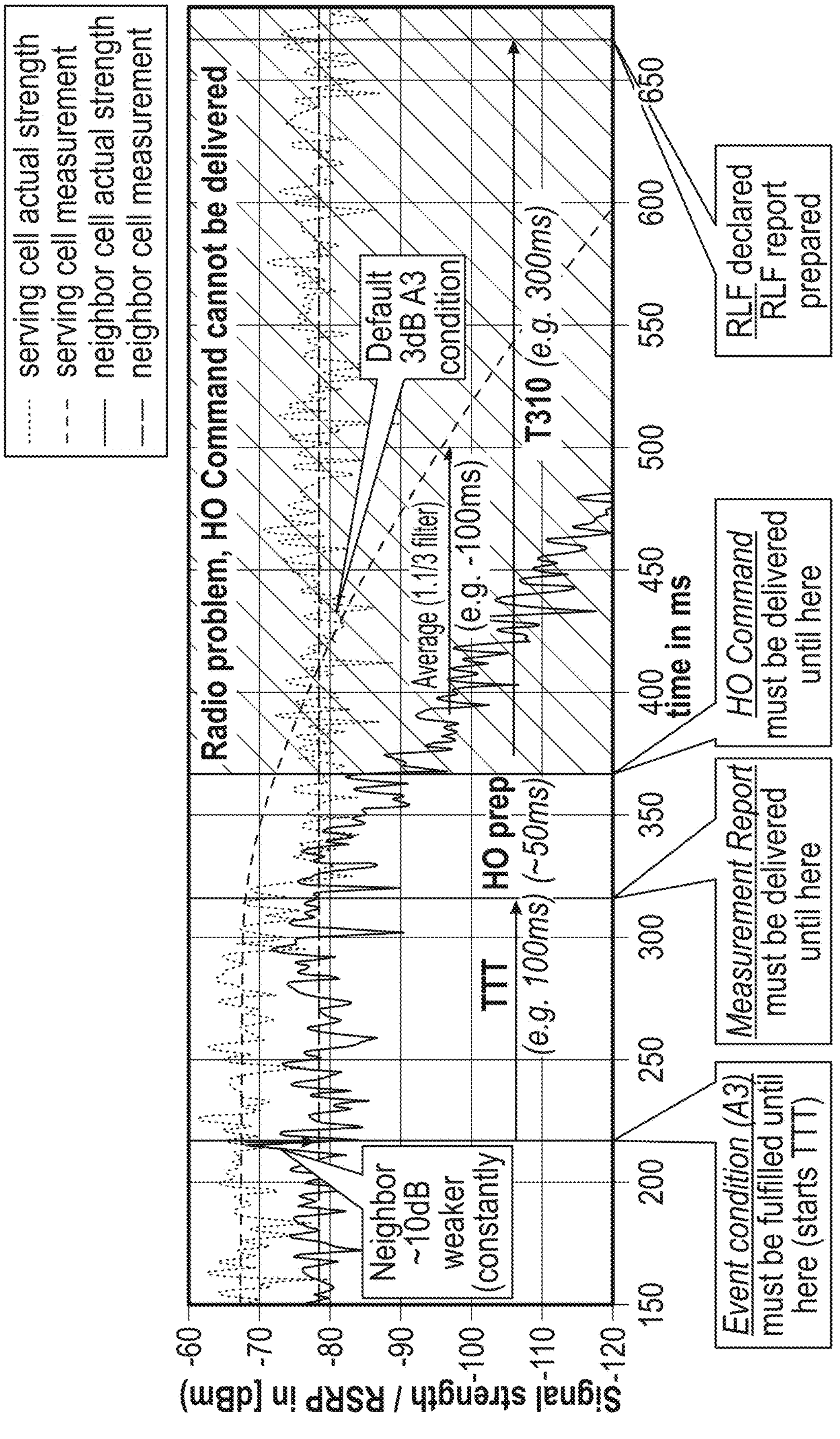
FIG. 9 shows signal strength against time for a too late (TL) handover scenario.

Considering the channel characteristics shown in FIG. 8 and explanations above, the aforementioned TL handover problem is illustrated in FIG. 9, which has been observed in system level simulations. In this example, the serving and target cell measurements are shown in red and blue, respectively where the solid line shows the actual strength (raw RSRP measurements) and dashed line shows the L3 filtered RSRP measurements.

The shaded area of the figure shows the time interval where the link between UE and the serving cell is interrupted due to low link quality (serving cell signal is drowning in interference of the target cell signal). This means, UE cannot send measurement report and/or receive handover command anymore. When the UE detects such a radio problem, it will start a timer (T310) during which it will try to recover the serving cell. The start of T310 and the start of the grey area (where UE cannot send measurement report and/or receive handover command) will not exactly coincide but may be assumed to be close.

Initially, the serving cell measurements does not decay although the UE moves away from the serving cell (although the path loss increases) since the beamforming gain compensates the path loss that increases with increased distance between UE and the serving cell. When the UE moves away further, actual RSRP of the serving cell decreases rapidly due to increasing path loss, decreasing beamforming gain and shadow fading on the cell edge (as also explained above). L3 measurement cannot follow the raw measurement due to filtering delay which is around 100 ms (see difference between dashed and solid red curves after t=300 ms). And the handover condition is only satisfied after the link between the serving cell and the UE is already too weak to allow delivery of measurement report or handover command (high interference from neighbor and weak signal from serving), i.e. the handover cannot be initiated by the network. The link is interrupted for longer than T310 ms and after the T310 expiry, the UE declares radio link failure (RLF). After that UE re-establishes to the target cell.

In the best-case scenario (to achieve successful handover through signaling before the grey area), the handover condition should be configured such that would be satisfied before t=220 ms and it will be satisfied for $T_{TTT}$=100 ms. Then, the measurement report will be sent around t=320 ms (right after $T_{TTT}$ expires). After 50 ms preparation delay, the network would deliver the handover command to the UE just before the link is interrupted (around t=370 ms) so that the UE could execute the handover towards target cell. However, in this best-case scenario, the condition that is assumed to be satisfied (target is still 10 dB weaker than source) would already be satisfied long time before ~t=210 ms. This would shift all the procedure back in time and cause early triggering of handover. That eventually would lead failure of the handover due to low target link quality. As a conclusion, such a problem may not be able to be solved with today's handover triggering mechanisms.

Besides, there are also UEs in the same cell border that are moving from open area to the left which also handover from red cell to blue cell. The signal between the red cell and the UEs would degrade slower than the scenario described above due to smoother angular view. Configuring reasonably small cell individual offset between red cell and blue cell would ensure successful handover of those UEs. These UEs would perform well (i.e. without failures) with default parameters. These UEs may suffer significantly from bad mobility performance, i.e., TE handovers, if larger cell individual offsets, i.e., 10 dB, are configured.

Considering the existence of different type of UEs and handovers in the same cell border, these types of too late handovers shown in FIG. 9 are called as "extreme TL" handovers since increasing the handover offset would not solve the extreme too late handovers but causes too early handover problems. In those cases, the network should not adjust the handover offset to solve those "extreme TL" handovers, otherwise, it would cause more "TE" handovers and eventually cause more link failures.

Conventional Mobility Robustness Optimization (MRO) (Rel9) assumes that the re-established gNB after RLF is the candidate that UE should have performed handover to (assuming too late handover to re-established gNB). In Rel10, MRO includes RLF report where more information, measurements, are added to RLF report to be used for root cause analysis. When an RLF happens, the UE stores some information (e.g., available measurements) into an RLF Report and indicates the availability of such a report to the network during the re-establishment process. The network can retrieve this RLF Report and use its content to analyze the mobility problems. This may allow "offline" MRO purely based on the information in the RLF Report. This offline MRO does not necessarily have to be done right after re-establishment in the target/serving node, it can also be done in another entity collecting data over a longer time (e.g. trace collection entity).

Figure 10:
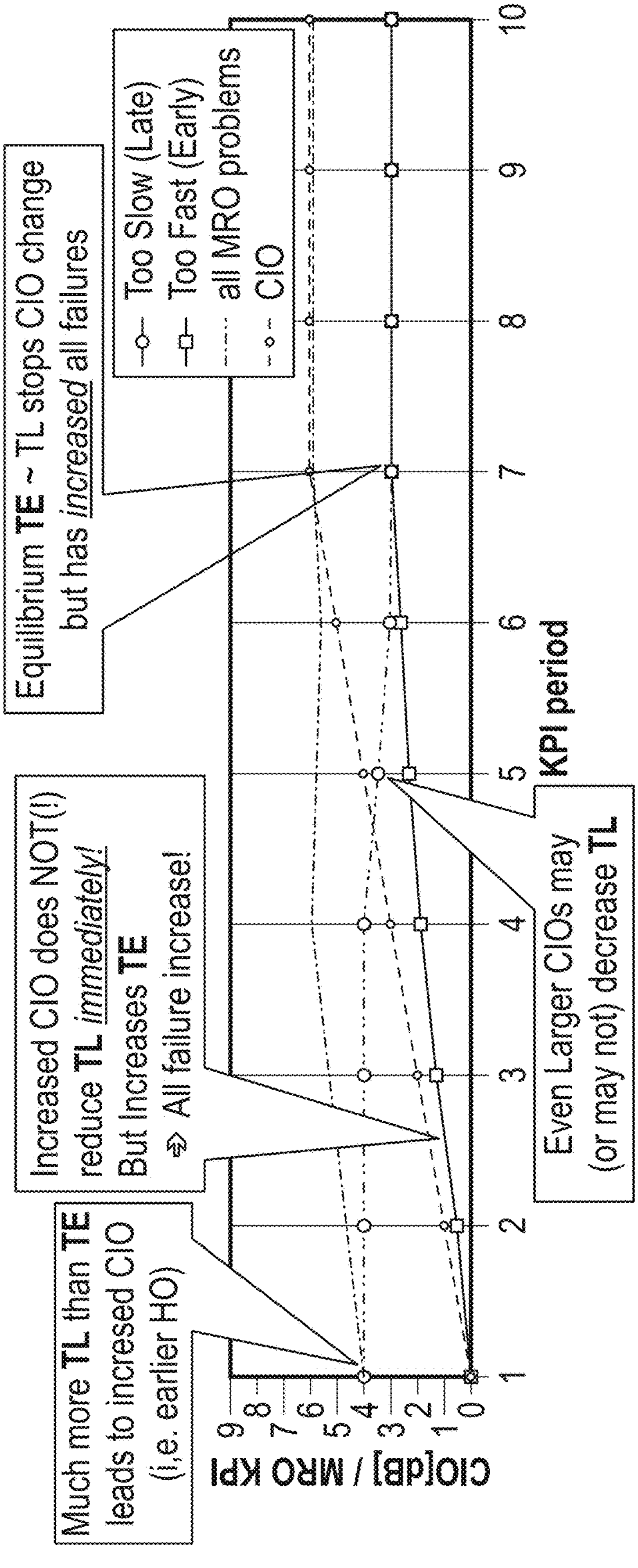
FIG. 10 shows MRO updates to cell individual offset over KPI periods.

Considering the re-established gNB after RLF and content of the existing RLF report, too late handovers are not further distinguished. Eventually root-cause analysis attempts to solve "unfixable too late" may endanger other successful handovers (turning them into too early handovers for the sake of too late treatment). In FIG. 10, an MRO example of one specific cell boundary is illustrated that pronounce the "unfixable too late" that degrades MRO performance. Here, MRO collects too early and too late events for each key performance indicator (KPI) period (could be minutes or days) and adjusts the cell individual offset (CIO) to reduce the total number of problems (TL handovers+TE handovers, shown in green). As it is shown in the figure, "TL" handovers are significantly dominant at the beginning of the optimization process (where CIO has its default of 0 dB). The MRO intuitively increases the CIO offset to overcome TL handover problems however, those TL handovers that are reported to MRO algorithm cannot be mitigated by increasing the CIO offset since they are unfixable as explained in FIG. 9). Instead, it causes some of the successful handovers to fail (TE handovers increases due to larger CIO offset).

There is no separation between reported TL events ("unfixable TL" or not) and, the type of TL events is not transparent to SON entity. For those cell borders, TL is reported (through SA5) to Self Organizing Networks (SON) entity and CIO is increased so that the UE initiates HO earlier. Increasing the offset in extreme cases does not solve the TL problem but cause TE handovers (additional failures).

The MRO paradigms may be suited to the FR1 scenarios. The nature of the FR1 propagation conditions in LTE and former systems may not cause unfixable delays and increasing CIO may improve too late problems more than it degraded too early problems.

In conditional handover (CHO), a target gNB can be prepared earlier than the link between the serving gNB and the UE has failed. This would let UE to execute handover in those "unfixable too late" cases since successful handover is not dependent on the UE-serving gNB link after preparation is completed. However, CHO is a feature that is not supported by all network nodes (and not by all UEs). In the case that CHO is not available, network would operate with baseline handover scheme and cannot solve "unfixable TL" problem with legacy methods. Even if CHO feature is available, preparation of the gNBs may lead to extremely early preparation. In the upper example, CHO preparation condition has to be fulfilled at T=220 ms (just as the HO condition), where target is 10 dB weaker. However, this condition is fulfilled significantly earlier, i.e. in this scenario it is not possible to determine a reasonable point in time for preparation. This may lead to unreasonably long CHO preparation and blocks network resources inefficiently.

It has been proposed that a UE starts logging available measurements from serving gNB and from one or more secondary cells for all out-of-sync indication from the physical layer. By using this information that is included in RLF report, network can analyze the measurements from both serving and neighbor gNBs and classify unfixable TL handovers. This proposal aims at eliminating failures caused by the extreme TL handovers from the KPI collection such that the optimization algorithm would not be impaired.

It has been proposed that a network facilitates from the Timing Advance (TA) to determine the HO trigger point in time. The TA is observed by the UE only in Line-of-Sight where the link between the UE and the serving cell is not blocked. The accuracy of the TA may deviate significantly in a mobile environment with multi-path characteristics, i.e., signal is received from reflectors and the distance traversed by the signal over air varies over time.

Figure 11:
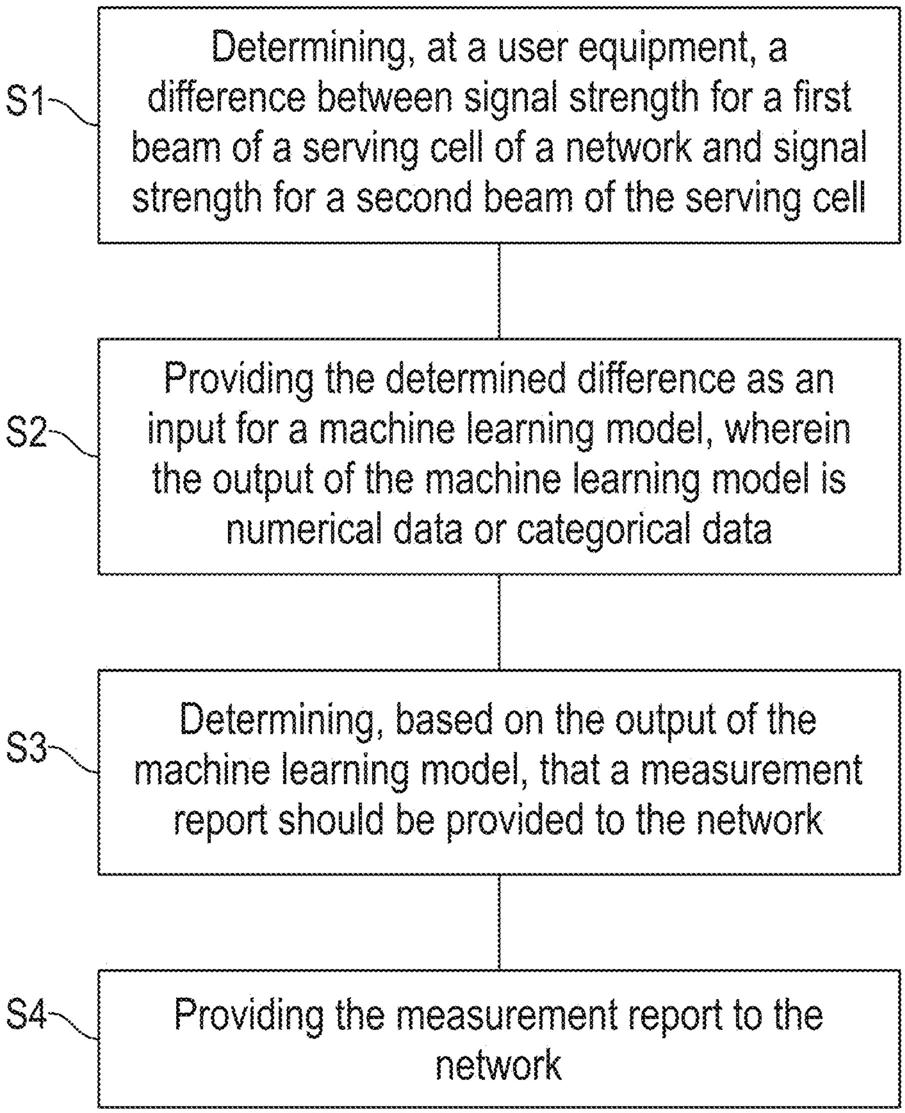
FIG. 11 shows a flowchart of a method according to an example embodiment.

FIG. 11 shows a flowchart of a method according to an example embodiment. The method may be performed at a UE.

In S1, the method comprises determining, at a user equipment, a difference between signal strength for a first beam of a serving cell of a network and signal strength for a second beam of the serving cell.

In S2, the method comprises providing the determined difference as an input for a machine learning (ML) model, wherein the output of the machine learning model is numerical data or categorical data.

In S3, the method comprises determining, based on the output of the machine learning model, that a measurement report should be provided to the network.

In S4, the method comprises providing the measurement report to the network.

FIG. 12 shows a flowchart of a model according to an example embodiment. The method may be performed at a base station, e.g., gNB, of a serving cell of a network.

In T1, the method comprises providing a configuration of a machine learning model to a user equipment from a serving cell of a network, wherein the input for the machine learning model is the difference between signal strength for a first beam of the serving cell and signal strength for a second beam of the serving cell determined at the user equipment and the output of the machine learning model is numerical data or categorical data.

In T2, the method comprises receiving a measurement report from the user equipment, wherein the user equipment determines to provide the measurement report based on the outcome of the machine learning model.

The method may further comprise determining a timing advance value of the serving cell of the network and a timing advance of at least one non-serving cell and providing the determined timing advance values as an input to the machine learning model.

The method may comprise providing an indication of the output of the machine learning model and/or an indication of the determined difference in the measurement report.

A method may comprise providing an indication of the determined difference from the serving cell to a non-serving cell of the network (e.g., from a source cell to a target cell). The indication may be provided in a handover request message.

The method may comprise determining, based on the determined difference, that a conditional handover procedure should be performed and means for performing the conditional handover procedure.

The method may comprise determining, at a user equipment, a difference between signal strength for a first beam of at least one non-serving cell and signal strength for a second beam of the at least one non-serving cell, providing the determined difference for the serving cell and the determined difference for the non-serving cell as an input for a further machine learning model, wherein the output of the further machine learning model is numerical data or categorical data, determining, based on the output of the further machine learning model, that a conditional handover procedure should be performed and performing the conditional handover procedure.

The method may further comprise determining a timing advance value of the serving cell of the network and a timing advance value of the non-serving cell and providing the timing advance values as further inputs for the machine learning model.

Determining that the measurement report should be provided to the network, or that the conditional handover procedure should be performed, may comprise comparing the output of the machine learning model, or the output of the further machine learning model respectively, to a threshold value. The numerical data may be discrete or continuous. The categorial data may be nominal or ordinal. The numerical data may comprise a probability value. In other words, the output of the ML model or the further ML model may comprise a probability value.

The ML model and the further ML model may be independent and uncorrelated ML models though they share the same inputs.

The first beam may comprise CSI-RS and the second beam may comprise SSB or PBCH. Determining signal strength for the first beam and the second beam may comprise determining RSRP. That is, the determined difference may be a difference between CSI-RS and SSB/PBCH RSRP measurements. The determined difference may be referred to as a delta measurement.

In an example embodiment, inputs for the ML model or the further ML model include a difference between SSB and CSI-RS RSRP measurements and, optionally, at least one of the SSB/CSI-RS measurements for serving and neighbour cells, TA (serving and neighbors), UE coordinates and Positioning Reference Signal of neighbors and UTC time.

Figure 13:
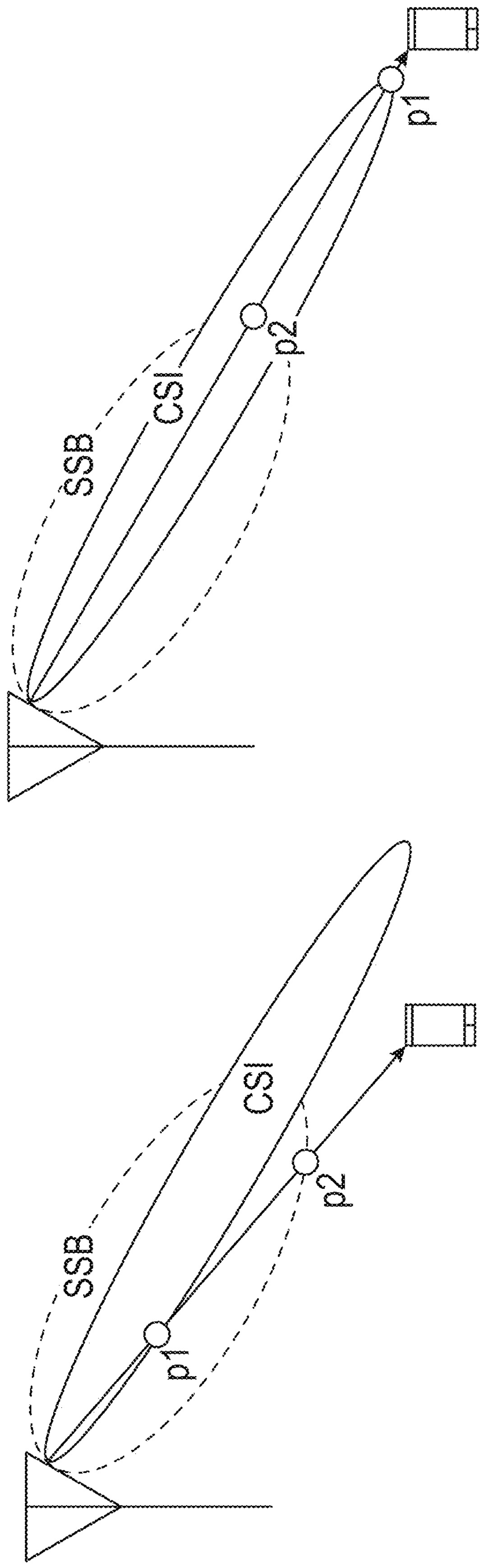
FIG. 13 shows a schematic diagram of the difference between SSB and CSI-RS RSRP at a non cell edge and a cell edge.

SSB beams are wide beams, while CSI-RS beams are narrow beams. As shown in FIG. 13, the signal strength received from the SSB at p2 is different compared to signal strength received from CSI-RS beam at p1 due to different beamforming gains. The difference between p1 and p2 signal strengths can be used to indicate the direction of the user toward cell edge when the CSI beam is one of the cell edge dedicated beams. The closer the user is to a cell edge, the closer the user is to the boresight of the CSI beam and the more the signal strength received from p1 compared to p2.

According to embodiments, in both baseline handover and CHO procedures, delta measurements are configured by the network on the UE side to be measured. Those delta measurements refer to the power difference between two different reference signals, i.e., SSB and CSI-RS where the former refers to wider beams with less beamforming gain and the latter refers to the steeper beams with high beamforming gain.

In a typical beamformed system, there will be multiple beam directions for both SSB and CSI-RS transmissions. In that case, the delta measurement should indicate which two beams to be used for evaluating the difference between the reference signals.

The method may comprise receiving, at the UE, receiving an indication of a first beam index and a second beam index and means for determining the first beam and the second beam based on the indication of the first beam index and the second beam index.

In an example embodiment, ta delta measurement configuration may indicate which two beams are to be considered for delta measurements.

For example, assume that the $$P^{i}_{SSB}$$

refers to the L1/L3 RSRP measurements of the SSB index i∈[1, $N_{SSB}$], where $N_{SSB}$ refers to the total number of SSB indices (or beams).

Assume that the $$P^{j}_{CSI-RS}$$

refers to the L1/L3 RSRP measurements of the CSI-RS index j∈[1, $N_{CSI-RS}$] where $N_{CSI-RS}$ refers to the total number of CSI-RS indices (or beams).

The network indicates the i, j in tuple such that the UE will measure the power difference $$P^{i}_{SSB} - P^{j}_{CSI-RS}$$

between the RSRP of $i^{th}$ SSB and RSRP of $j^{th}$ CSI-RS beam.

The network may provide at UE with multiple tuples to obtain several delta measurements to be used in ML algorithm input.

The method may learn the extreme TL HO characteristics and trigger HO before the link between UE and the serving cell is interrupted. The method may provide an ML assisted extreme TL HO avoidance technique.

The network trains a ML model that will trigger the HO considering the extreme TL HOs. The ML model will be trained to predict the Extreme TL HO characteristics (for example and in the simplest form, to predict the upcoming near future extreme TL HO situation (e.g. the output of the ML model or further ML model may be 1: situation predicted, and 0: situation not predicted)).

Figure 14:
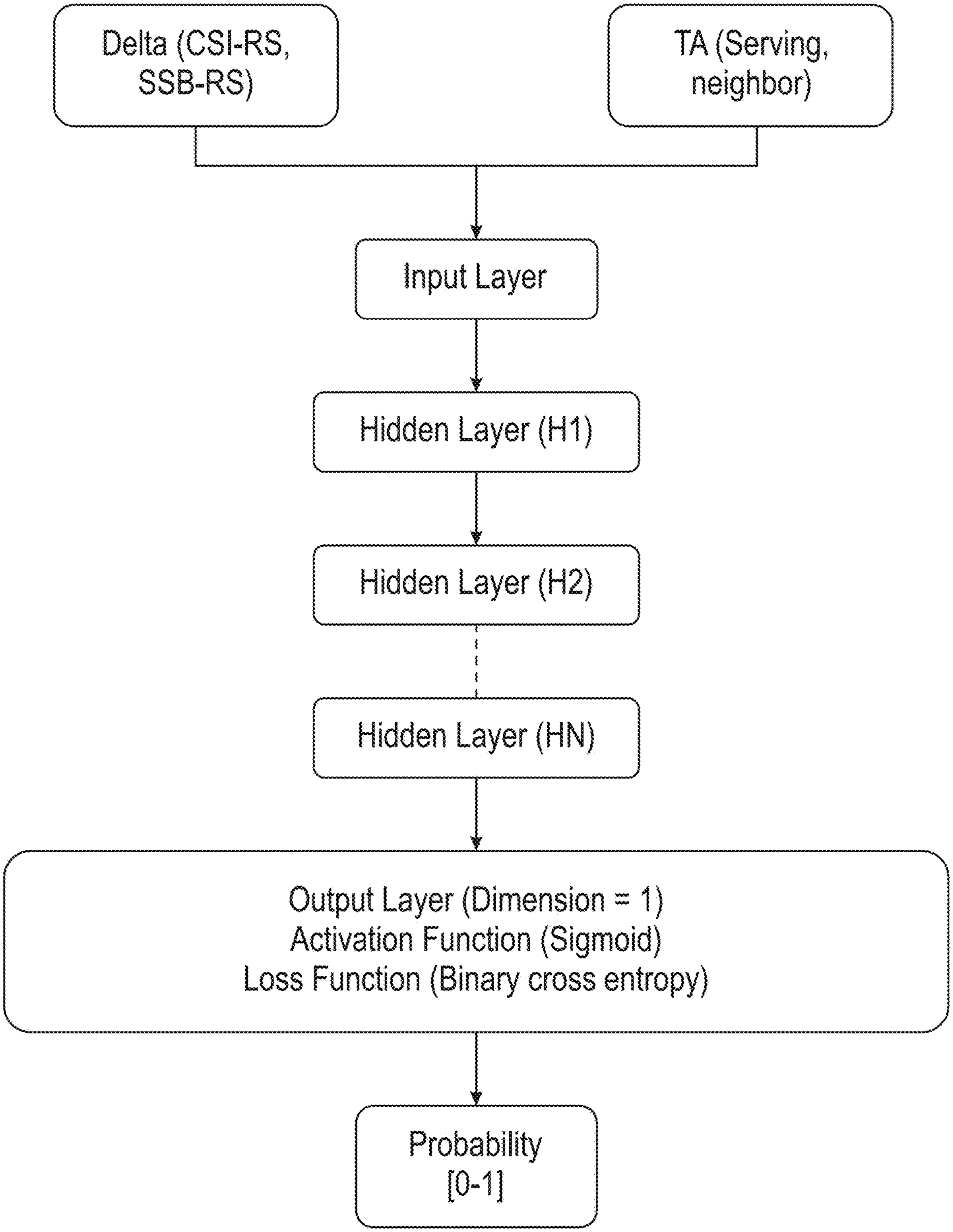
FIG. 14 shows an example machine learning model structure.

FIG. 14 shows an example ML model that may be used for both predicting the trigger of measurement reporting or for CHO HO execution. Two separate models should be trained with different labeling as one will be used for measurement triggering which is less sensitive compared to other model which will be used for HO execution.

Figure 18:
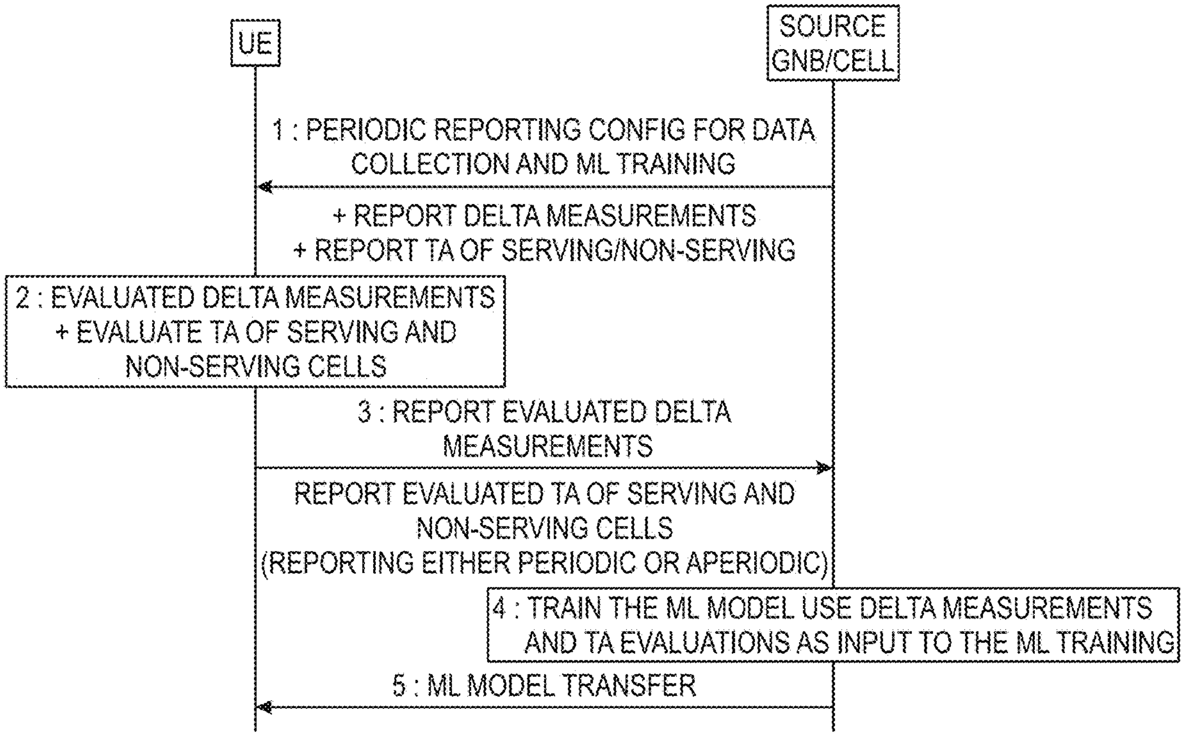
FIG. 18 shows a signalling flow according to an example embodiment.

Since an ML model that predicts to trigger measurements reporting or not and another model to trigger HO execution or not, in both ML models the output may be a binary classification (class ON, class OFF), for that we propose a binary classification model as shown in FIG. 18.

The example ML model in FIG. 14, will output a probability [0-1] for triggering ON/OFF measurements reporting as well in another ML model to trigger HO execution. The network ML configurations may include also a threshold between [0-1] to be used by the user terminal to compare its ML model output against it.

IF $ML_{out} \geq Trigger_{th}$,
THEN trigger action
ELSE, do nothing

Where, $Trigger_{th}$, is a threshold used by the user and received from network as part of the ML configurations.

Figure 15:
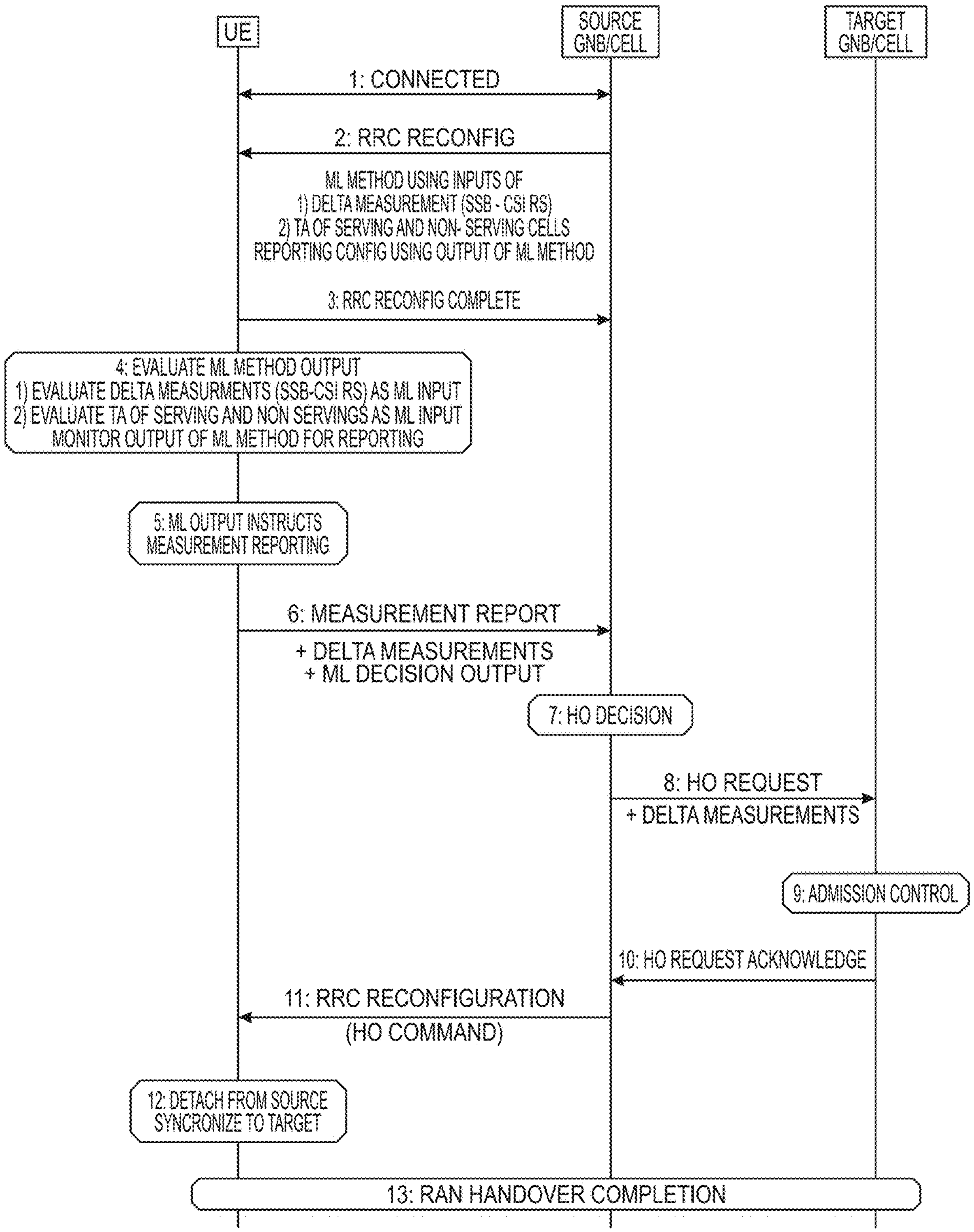
FIG. 15 shows a signalling flow according to an example embodiment.

FIG. 15 shows a flowchart of an example baseline handover procedure.

In step 1, UE is connected to source gNB/cell.

In step 2, the source gNB/cell configures UE with RRC Reconfiguration message. The source gNB/cell configures UE with an ML method that UE will use to avoid the extreme TL handovers.

The network may configure the UE to evaluate delta measurements, i.e., SSB-CSI RS, and TA of serving and non-serving cells and use them as input of the ML model.

The network may configure the UE to monitor the output of the ML model and report the output of the ML model along with at least the last delta measurements.

In step 3, the UE responds to the source gNB/cell with RRC Reconfiguration Complete message to acknowledge the given configurations in the previous message.

In step 4: UE behaves as it was instructed by the network in RRC Reconfiguration message.

The UE evaluates the inputs of the ML method, i.e., Delta measurements between SSB-CSI RS, TA of serving and non-serving cells and the TA of the serving and non serving cell.

UE uses both SSB-CSI RS and TA evaluations as input to the ML model

UE monitors the output of the ML method which indicates to UE whether the reporting towards the source gNB/cell should be triggered.

In step 5, the output of the ML method indicates that the UE should send the measurement report that is associated with the ML method to the source gNB/cell.

In step 6, the UE sends the measurement report to source gNB/cell. The UE includes the indicated delta measurements and ML decision output(s) that are requested from the UE in configuration of step 2.

In step 7, the source gNB/cell analyze the received measurement report and decide on the HO of the UE from source gNB/cell to target gNB/cell.

In step 8, the source gNB/cell sends the HO request to the target gNB/cell. Source gNB/cell includes the delta measurements in the HO request message.

In step 9, the target gNB/cell performs admission control and decides to accept the HO request.

In step 10, the target gNB/cell sends the HO Request Acknowledge message along with the necessary configurations that are needed by the UE during and after the HO towards the target gNB/cell.

In step 11, the source gNB/cell sends the RRC Reconfiguration to the UE that includes the HO command to instruct the UE for HO from source gNB/cell towards the target gNB/cell.

In step 12, the UE detaches from the source gNB/cell and starts UL/DL sync towards target gNB/cell.

In step 13, the RAN handover is completed.

In CHO, the network can facilitate the ML model for both the CHO preparation and CHO execution phases.

Figure 16:
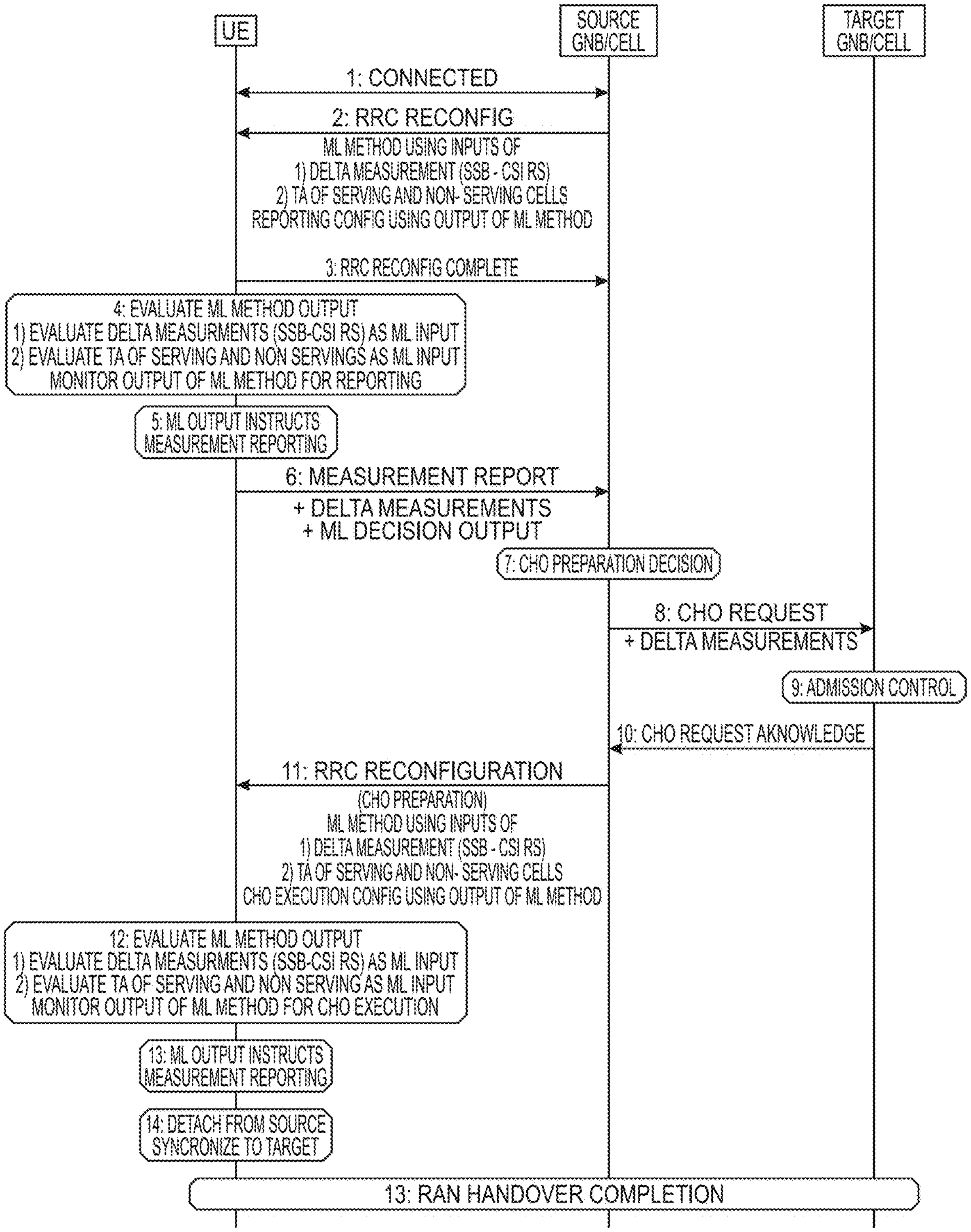
FIG. 16 shows a signalling flow according to an example embodiment.

FIG. 16 shows a message sequence chart of the CHO preparation and execution procedure that facilitate the method described above.

The CHO preparation procedure in steps 1 to 10 can use the same procedure that is used in baseline handover steps 1 to 10 in FIG. 15. The difference between these two procedures is that the target cell configuration will be used for conditional execution of handover in CHO, where it is immediately executed in baseline handover.

In step 11, the source gNB/cell configures UE with the target cell/gNB preparation. The source gNB/cell configures UE with a further ML method that UE will use to avoid the extreme TL CHO execution handovers.

In one example embodiment the network configures the UE to evaluate the Delta measurements, i.e., SSB-CSI RS and TA of serving and non-serving cells and use then as input of the further ML model In another example embodiment, the network configures the UE to monitor the output of the further ML model for CHO execution and execute the CHO towards the target gNB/cell based on the output.

The ML model in step 2 is used to trigger the measurement reporting whereas the further ML model in step 11 is used to trigger the CHO execution.

In step 12, the UE behaves as it was instructed by the network in RRC Reconfiguration message of previous step. The UE evaluates the inputs of the ML method, i.e., SSB-CSI RS, TA of serving and non-serving cells. The UE evaluates the TA of the serving and non serving cell. The UE uses both SSB-CSI RS and TA evaluations as input to the further ML model for CHO execution. The UE monitors the output of the further ML method which indicates UE whether the CHO execution towards the target gNB/cell should be triggered.

In step 13, the output of the ML method for CHO indicates that the UE should execute the CHO towards the target gNB/cell.

In step 14, the UE detaches from the source gNB/cell and starts UL/DL sync towards target gNB/cell.

In step 15, the RAN handover is completed.

At least one of position information or timing information may be provided as input to the ML model or the further ML model. In one example embodiment, the network may configure the UE to use the positioning and time information as an input to the ML evaluation for both baseline handover and CHO procedure. For this, the network configures the UE to provide the New Radio Positioning Reference Signal (NR PRS) for downlink positioning and Sounding Reference Signal (SRS) for uplink positioning and UTC timer for timing which may improves the accuracy of the triggering decision.

The ML model to be used for measurement report triggering for baseline handover triggering, measurement report triggering for conditional handover preparation triggering and/or CHO execution triggering must be trained.

In one example embodiment the UE will used the determined difference between SSB and CSI-RS RSRP measurements info to train the model. In another example embodiment the UE will report this information to train the model at the network.

The method may comprise receiving a configuration to train the machine learning model or the further ML model at the user equipment and using at least one of the determined difference and the timing advances to train the machine learning model or the further ML model, respectively.

In one example embodiment, the network trains the ML model at UE side. In this example embodiment, the network configures UE with ML training, i.e., inputs of the training model and reporting the outcome of the trained model. This may be reported to the network after a successful handover or after a recovery performed after a handover failure or radio link failure. Although this embodiment refers to the ML model, it is also applicable to the further ML model.

Alternatively, the method may comprise providing an indication of the determined differences and determined timing advance vales to the network for use in training the machine learning model or the further ML model at the network.

For example, in another embodiment, the network trains the ML model at network side. In this example embodiment, the network configures UE to report the inputs of the training model. The network provides the trained ML model to UE. The UE is configured to decide HO based on trained model's decision. The UE is configured to use the inputs that are relevant to the extreme TL handover avoidance. Although this embodiment refers to the ML model, it is also applicable to the further ML model.

Offline ML model training is assumed. ML model training may be carried out either at the user side directly (local ML model per user), or at the network side (global model) which will be shared with users based on their preshared (known capabilities). The ML model referred to below may also be the further ML model.

For UE side ML model training, it is proposed that the UE trains the ML models used for the extreme TL handover avoidance. For this, the source gNB/cell provides the ML model configurations (e.g., Model's input/output dimensions) to be used for constructing and training an ML model at the UE side.

Figure 17:
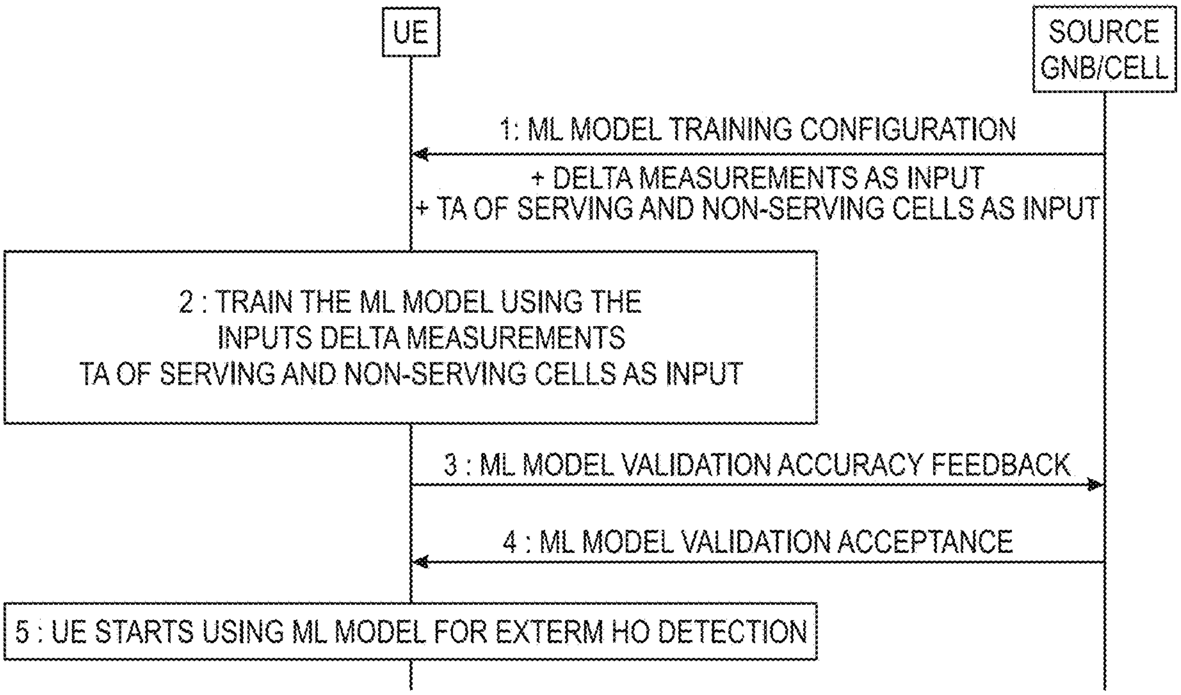
FIG. 17 shows a signalling flow according to an example embodiment.

The network may provide some configurations for labelling the training data (e.g., how many CSI beams per SSB beams to consider in the delta calculations). The ML model configurations may be based on pre user's capabilities sharing between the UE and the network. As shown in FIG. 17, the network shares the ML model configurations and defines at least the following parameters as input to the ML model training: delta measurements between SSB and CSI-RS RSRPs and TA of serving and non-serving cells The UE trains the ML model offline using the aforementioned parameters as input to the ML model, utilizing history collected/labeled data, and report the trained ML model validation accuracy to the source gNB/cell. The reporting may be also done upon request of the source gNB/cell, after a predefined time elapsed, or via new serving gNB/cell after a handover. The network checks the validation accuracy of the ML model and if valid it sends a validation acceptance message to the user so it can starts using the ML model for performing extreme TL HO detection for either triggering measurement reporting to for direct HO execution in case of CHO execution.

FIG. 18 shows a signalling flow for network side ML training. For network side ML training, the network, i.e., source gNB/cell, trains the ML model used for the extreme TL handover avoidance (global ML model). For this, the source gNB/cell configures UE to report the following parameters that are needed on the network side for ML model training and it will keep collecting these data for an offline training/labelling: UE to calculate and report the delta measurements and UE to evaluate and report the TA of serving and non-serving cells.

Then, UE evaluates both delta measurements and TA of serving/non-serving cells.

Depending on the configuration, the UE will report evaluated delta measurements and TA of serving/non-serving cells either periodically or aperiodically. The source gNB/cell uses the reported evaluations to train the ML model that will be shared with the users based on pre shared (known) user's capabilities later for extreme TL handover evaluation.

An apparatus may comprise means for determining, at a user equipment, a difference between signal strength for a first beam of a serving cell of a network and signal strength for a second beam of the serving cell, means for providing the determined difference as an input for a machine learning model, wherein the output of the machine learning model is numerical data or categorical data, means for determining, based on the output of the machine learning model, that a measurement report should be provided to the network and means for providing the measurement report to the network.

Alternatively, an apparatus may comprise means for providing a configuration of a machine learning model to a user equipment from a serving cell of a network, wherein the input for the machine learning model is the difference between signal strength for a first beam of the serving cell and signal strength for a second beam of the serving cell determined at the user equipment and the output of the machine learning model is numerical data or categorical data and means for receiving a measurement report from the user equipment, wherein the user equipment determines to provide the measurement report based on the outcome of the machine learning model.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising: at least one processor and at least one memory storing instructions that, when executed by the at least one processor, cause the apparatus at least to:

receive an indication of a first beam index and a second beam index;

determine, at a user equipment, a difference between signal strength for a first beam of a serving cell of a network and signal strength for a second beam of the serving cell, wherein the first beam of the serving cell comprises a channel state information reference signal and the second beam of the serving cell comprises a synchronization signal or a physical broadcast channel, wherein the first beam and the second beam are determined based on the indication of the first beam index and the second beam index;

determine a timing advance value of the serving cell and a timing advance value of at least one non-serving cell;

provide the determined timing advance values and the determined difference between the signal strength for the first beam of the serving cell and the signal strength for the second beam of the serving cell as inputs for a machine learning model, wherein an output of the machine learning model is numerical data or categorical data, wherein the numerical data comprises a probability value, wherein the machine learning model is used for measurement reporting;

determine, based on the output of the machine learning model, that a measurement report should be provided to the network, wherein the measurement report comprises an indication of the output of the machine learning model and an indication of the determined difference between the signal strength for the first beam of the serving cell and the signal strength for the second beam of the serving cell, wherein determining that the measurement report should be provided to the network comprises comparing the output of the machine learning model to a threshold value;

provide the measurement report to the network;

receive a configuration from the network to train the machine learning model at the user equipment;

use the determined timing advance values and the determined difference between the signal strength for the first beam of the serving cell and the signal strength for the second beam of the serving cell to train the machine learning model at the user equipment;

determine, at the user equipment, a difference between signal strength for a first beam of at least one non-serving cell and signal strength for a second beam of the at least one non-serving cell;

determine a timing advance value of the serving cell of the network and a timing advance of the at least one non-serving cell;

provide the determined difference for the serving cell and the determined difference for the non-serving cell and the determined timing advance values as inputs for a further machine learning model, wherein the output of the further machine learning model is numerical data or categorical data, wherein the further machine learning model is configured for triggering conditional handover execution and is independent from the machine learning model;

determine, based on the output of the further machine learning model, that a conditional handover procedure should be performed, wherein determining that the conditional handover procedure should be performed comprises comparing the output of the further machine learning model to a threshold value;

perform the conditional handover procedure;

receive a configuration from the network to train the further machine learning model at the user equipment; and use the determined difference and the timing advances values to train the further machine learning model at the user equipment.

* * * * *